(12) United States Patent
Kim et al.

(10) Patent No.: US 10,638,435 B2
(45) Date of Patent: Apr. 28, 2020

(54) METHOD AND DEVICE FOR PERFORMING DEVICE-TO-DEVICE SYNCHRONIZATION IN WIRELESS COMMUNICATION SYSTEM

(71) Applicant: LG ELECTRONICS INC., Seoul (KR)

(72) Inventors: Myoungseob Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/329,878

(22) PCT Filed: Jul. 30, 2015

(86) PCT No.: PCT/KR2015/008008
§ 371 (c)(1),
(2) Date: Jan. 27, 2017

(87) PCT Pub. No.: WO2016/018107
PCT Pub. Date: Feb. 4, 2016

(65) Prior Publication Data
US 2017/0265155 A1 Sep. 14, 2017

Related U.S. Application Data

(60) Provisional application No. 62/031,154, filed on Jul. 30, 2014.

(51) Int. Cl.
*H04W 56/00* (2009.01)
*H04L 1/18* (2006.01)
(Continued)

(52) U.S. Cl.
CPC ......... *H04W 56/001* (2013.01); *H04L 1/1671* (2013.01); *H04L 1/1854* (2013.01);
(Continued)

(58) Field of Classification Search
CPC . H04W 56/001; H04W 76/14; H04W 76/023; H04W 72/0446; H04W 88/02
(Continued)

(56) References Cited

U.S. PATENT DOCUMENTS

2003/0069037 A1* 4/2003 Kiyomoto ............. H04W 60/04
455/552.1
2006/0133526 A1* 6/2006 Zhang ................. H04L 27/2613
375/260
(Continued)

OTHER PUBLICATIONS

3GPP TR 36.843 V12.0.1, "3rd Generation Partnership Project; Technical Specification Group Radio Access Network; Study on LTE Device to Device Proximity Services; Radio Aspects (Release 12)", Mar. 27, 2014, pp. 1-51.
(Continued)

*Primary Examiner* — Christopher R Crompton
(74) *Attorney, Agent, or Firm* — Birch, Stewart, Kolasch & Birch, LLP

(57) ABSTRACT

The present invention relates to a method and a device for reselecting a synchronization signal in a wireless communication system supporting device-to-device direct communication and the method includes: receiving a first synchronization signal from a second UE and receiving a second synchronization signal from a third UE; comparing a first reception power level indicating reception power of the first synchronization signal and a second reception power level indicating the reception power of a second synchronization signal with a first threshold value indicating minimum reception power; and selecting the first synchronization signal or the second synchronization signal according to the comparison result, and the synchronization signal is a synchronization signal selected in the previously synchronization procedure.

14 Claims, 26 Drawing Sheets

(51) Int. Cl.

| | | |
|---|---|---|
| *H04L 27/26* | (2006.01) | |
| *H04L 1/16* | (2006.01) | |
| *H04W 88/02* | (2009.01) | |
| *H04L 5/00* | (2006.01) | |
| *H04L 1/06* | (2006.01) | |
| *H04L 1/00* | (2006.01) | |
| *H04W 8/00* | (2009.01) | |
| *H04W 76/14* | (2018.01) | |
| *H04W 72/04* | (2009.01) | |

(52) U.S. Cl.
CPC ..... *H04L 27/2692* (2013.01); *H04W 56/0025* (2013.01); *H04W 88/02* (2013.01); *H04L 1/00* (2013.01); *H04L 1/0026* (2013.01); *H04L 1/0618* (2013.01); *H04L 5/001* (2013.01); *H04L 5/0048* (2013.01); *H04L 5/0051* (2013.01); *H04L 5/0055* (2013.01); *H04L 27/26* (2013.01); *H04L 2001/0097* (2013.01); *H04W 8/005* (2013.01); *H04W 72/0446* (2013.01); *H04W 76/14* (2018.02); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/162* (2018.01); *Y02D 70/164* (2018.01); *Y02D 70/166* (2018.01); *Y02D 70/21* (2018.01); *Y02D 70/23* (2018.01); *Y02D 70/25* (2018.01)

(58) Field of Classification Search
USPC .......................................................... 370/350
See application file for complete search history.

(56) References Cited

U.S. PATENT DOCUMENTS

| | | | |
|---|---|---|---|
| 2010/0093349 A1 | 4/2010 | Gandhi et al. | |
| 2013/0040688 A1* | 2/2013 | Mizusawa | H04W 52/367 455/522 |
| 2013/0316762 A1 | 11/2013 | Charbit et al. | |
| 2014/0140456 A1 | 5/2014 | Tavildar et al. | |
| 2015/0215883 A1* | 7/2015 | Zheng | H04W 52/30 455/426.1 |
| 2015/0264588 A1* | 9/2015 | Li | H04W 56/0015 370/350 |
| 2015/0296469 A1* | 10/2015 | Yoon | H04W 76/14 370/350 |
| 2015/0326362 A1* | 11/2015 | Xiong | H04W 8/005 370/336 |
| 2017/0013578 A1* | 1/2017 | Wei | H04W 8/005 |
| 2017/0142741 A1* | 5/2017 | Kaur | H04W 76/18 |
| 2017/0230922 A1* | 8/2017 | Zhao | H04L 5/14 |

OTHER PUBLICATIONS

Intel Corporation, "Synchronization Procedure for D2D Communication", R1-142022, 3GPP TSG RAN WG1 Meeting #77, Seoul, Korea, May 10, 2014, pp. 1-5.

* cited by examiner

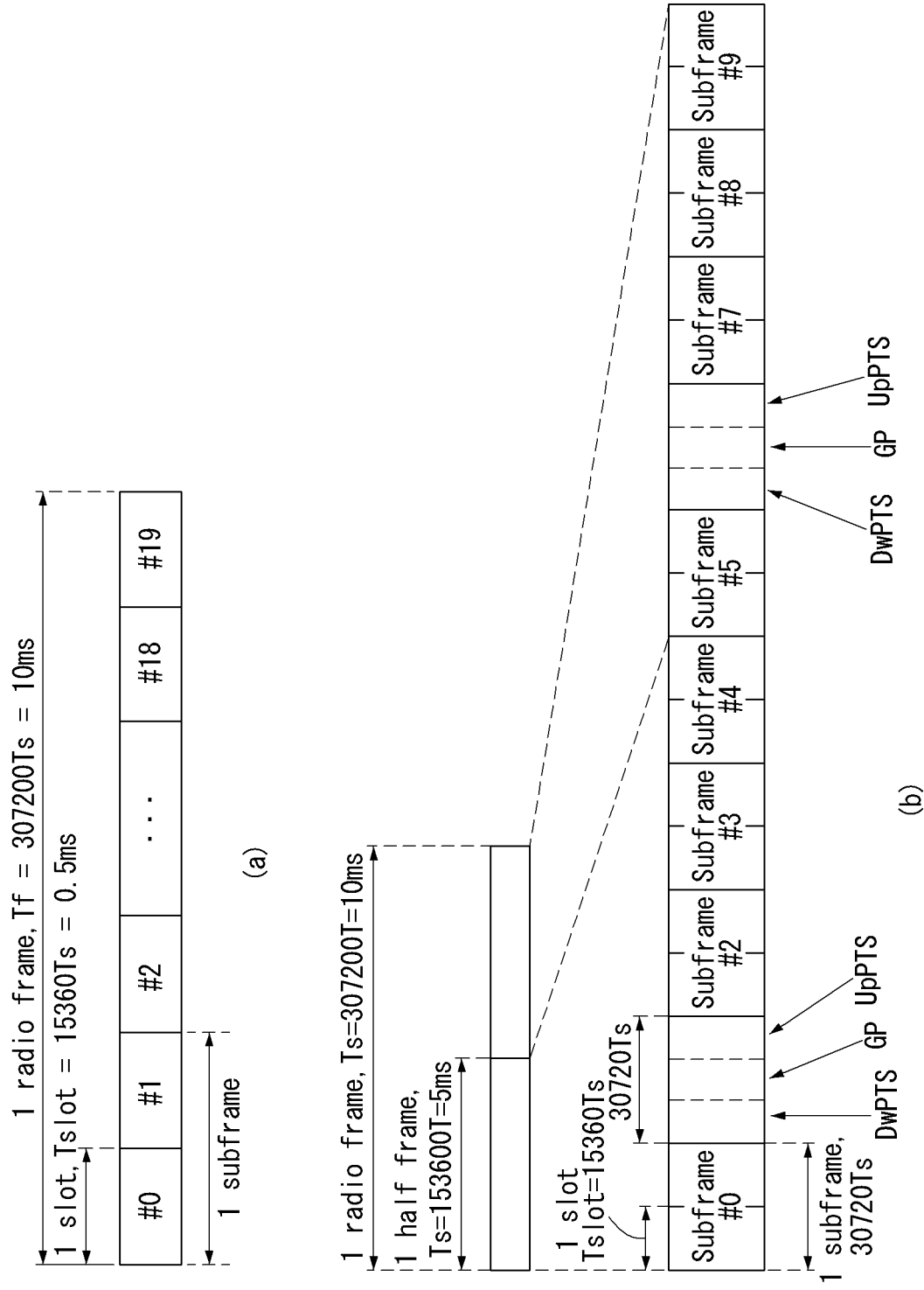
[FIG. 1]

[FIG. 2]
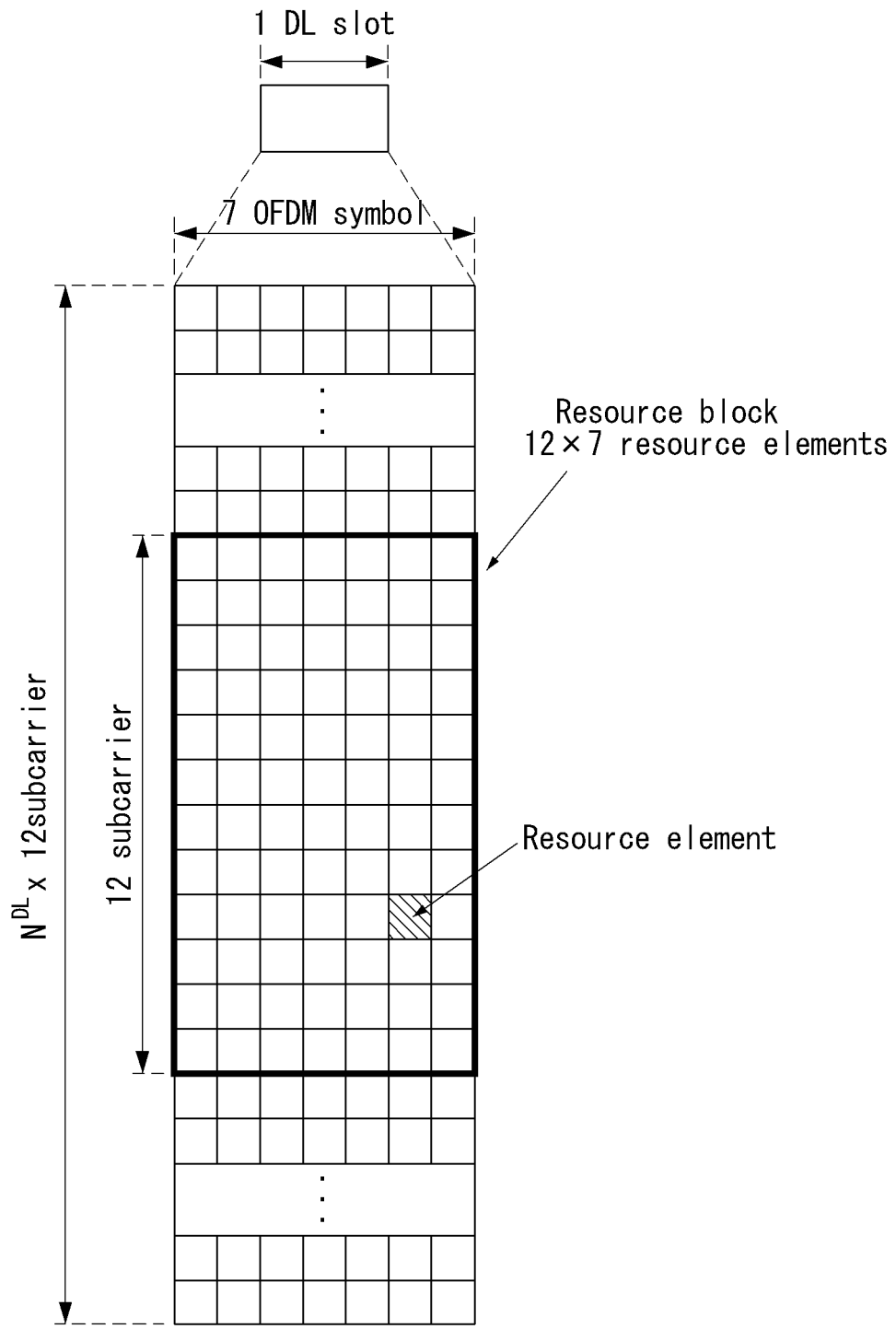

[FIG. 3]
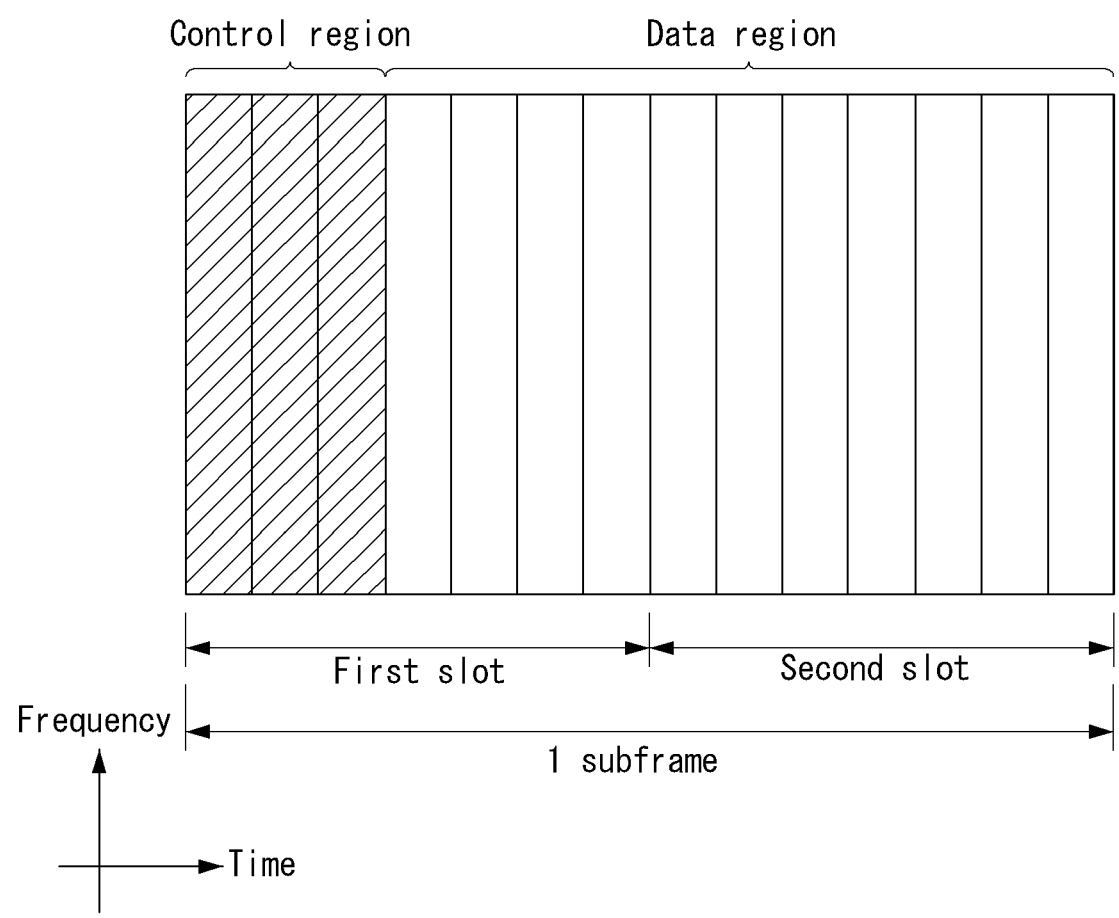

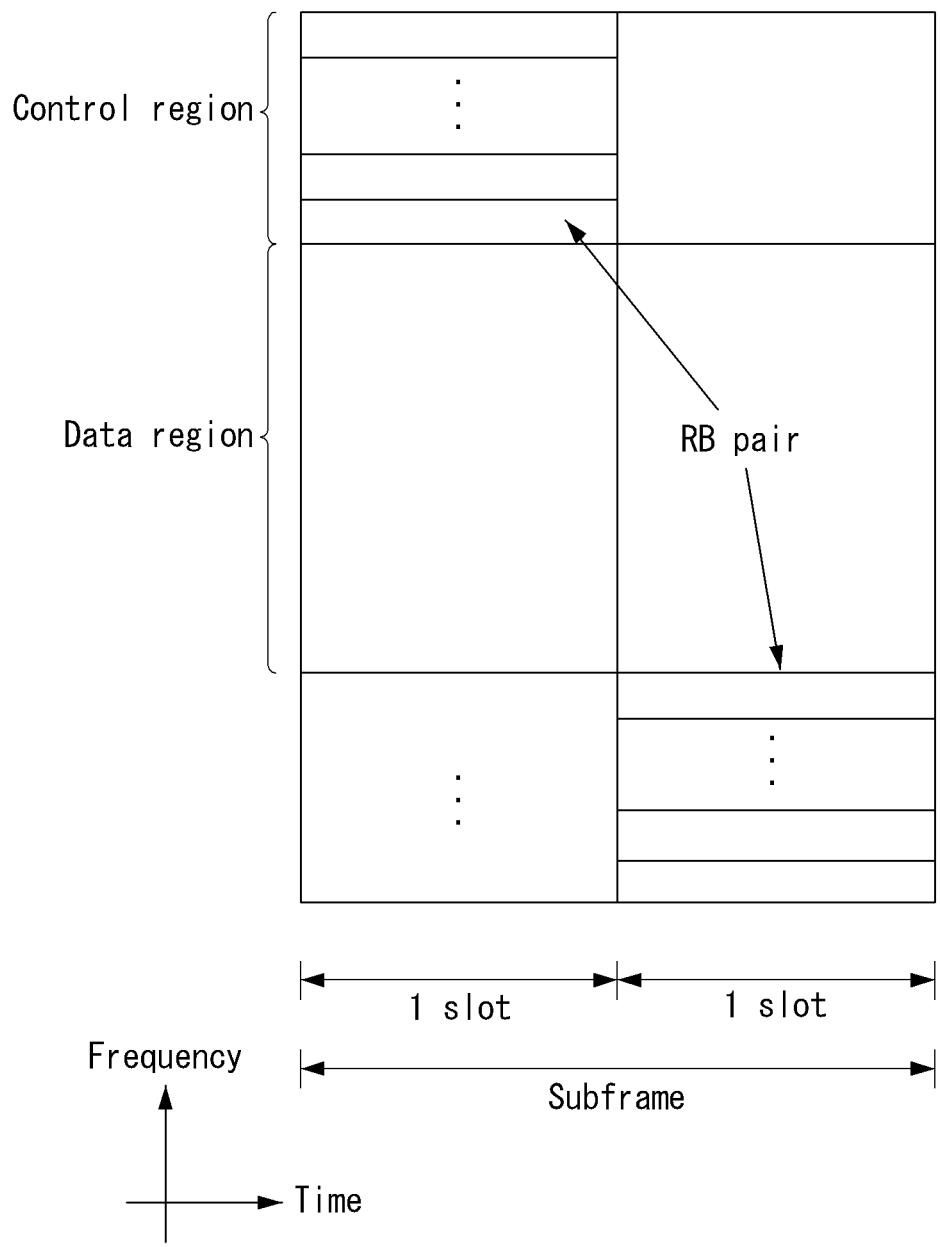
[FIG. 4]

[FIG. 5]
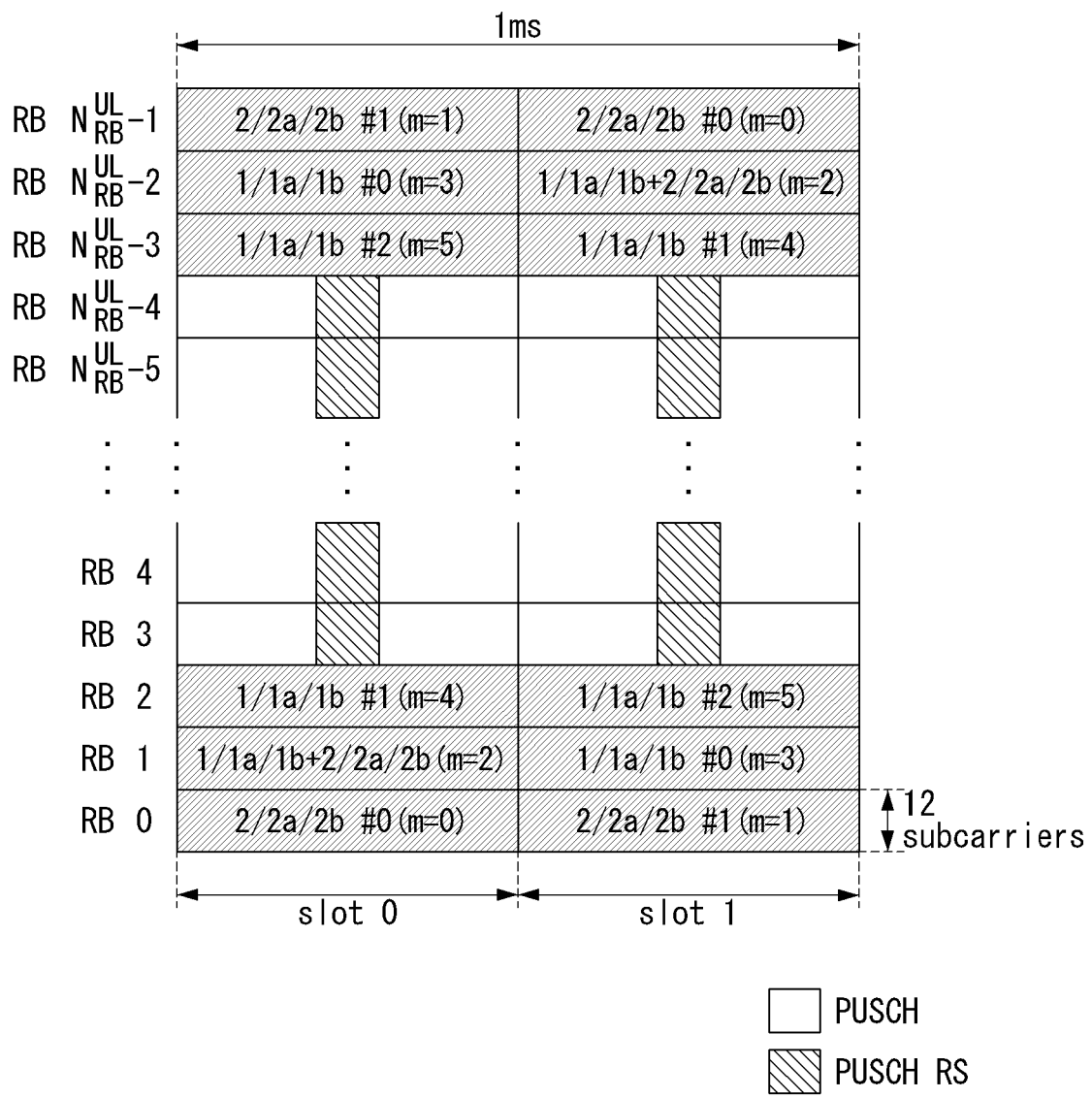

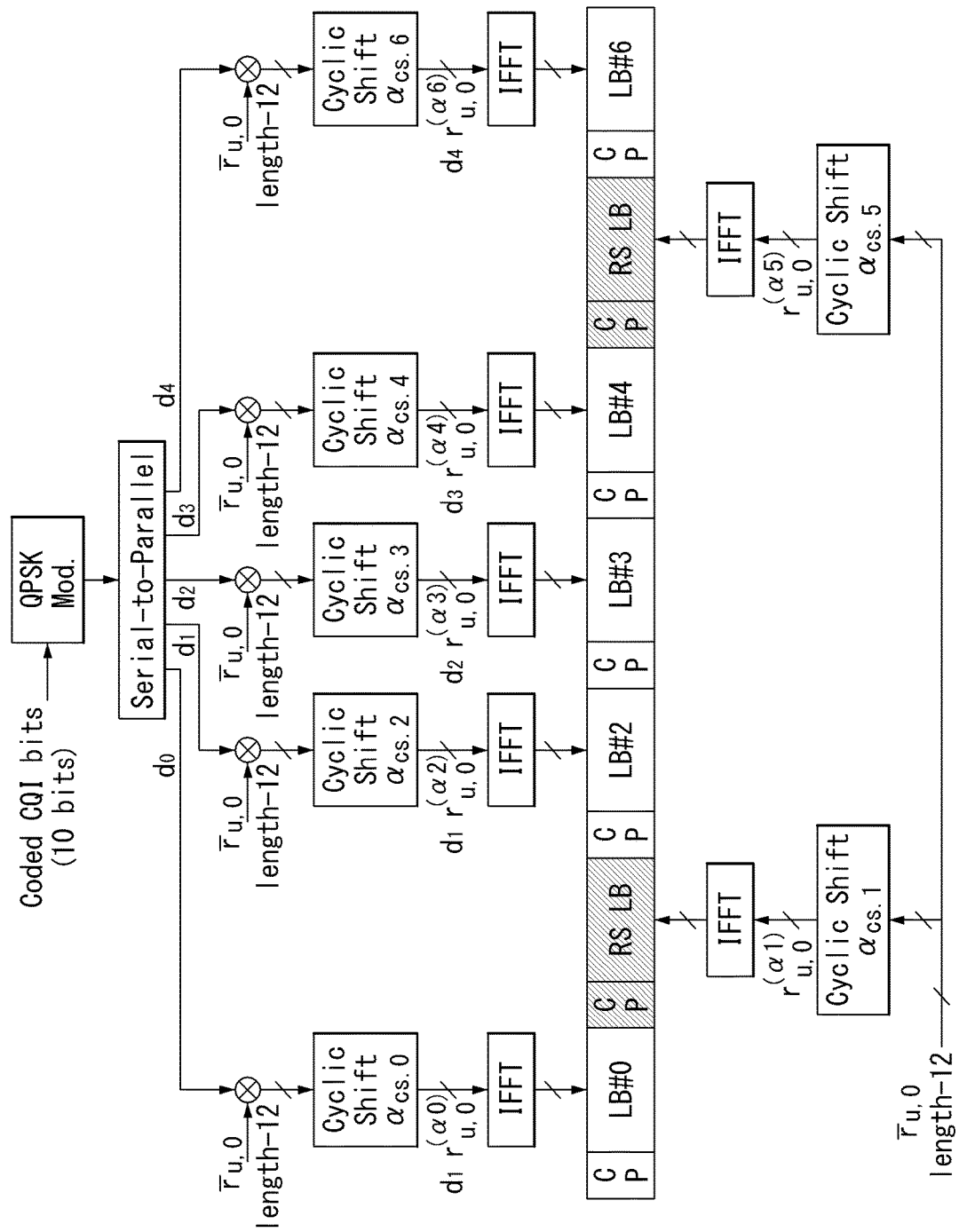
[FIG. 6]

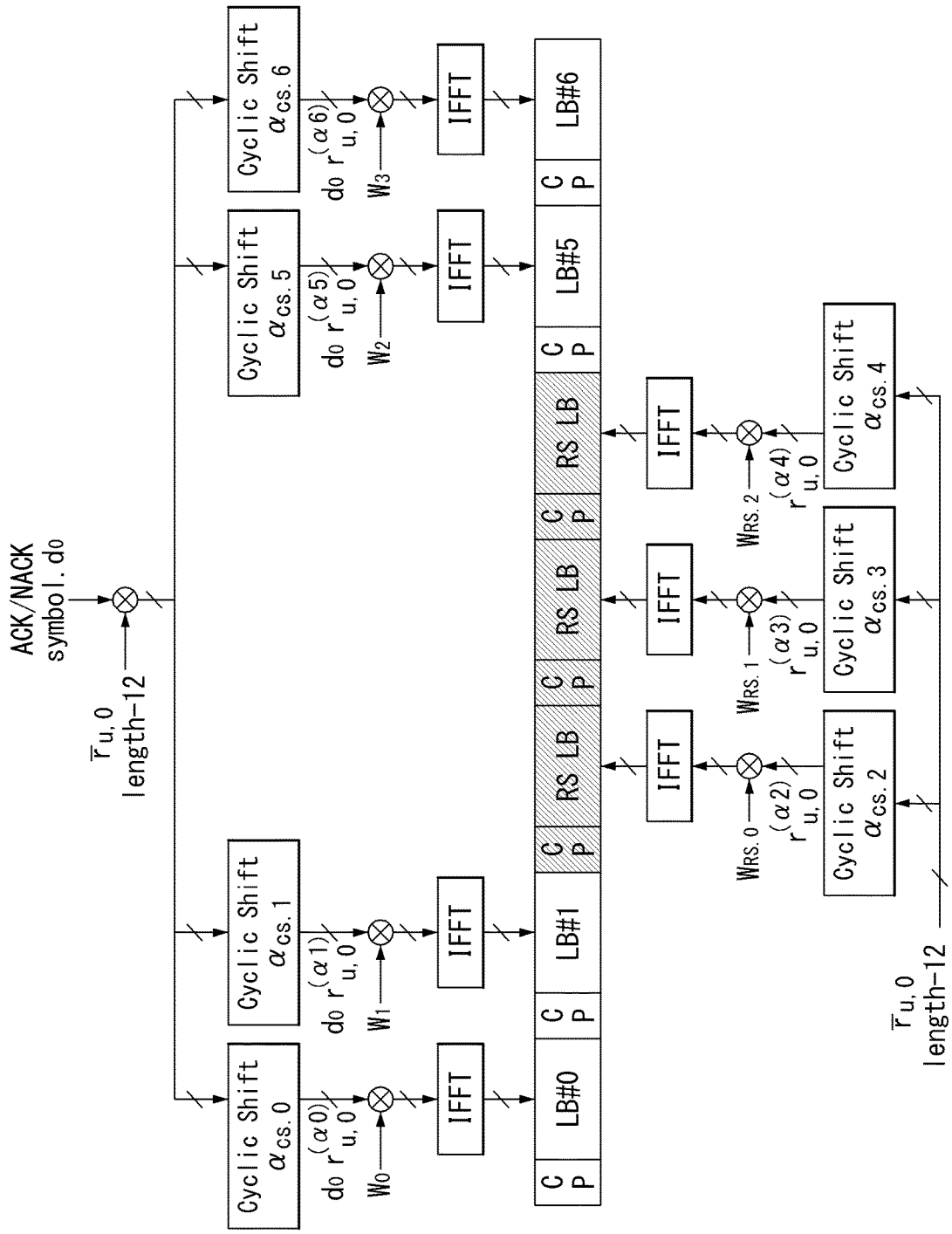
[FIG 7]

[FIG. 8]
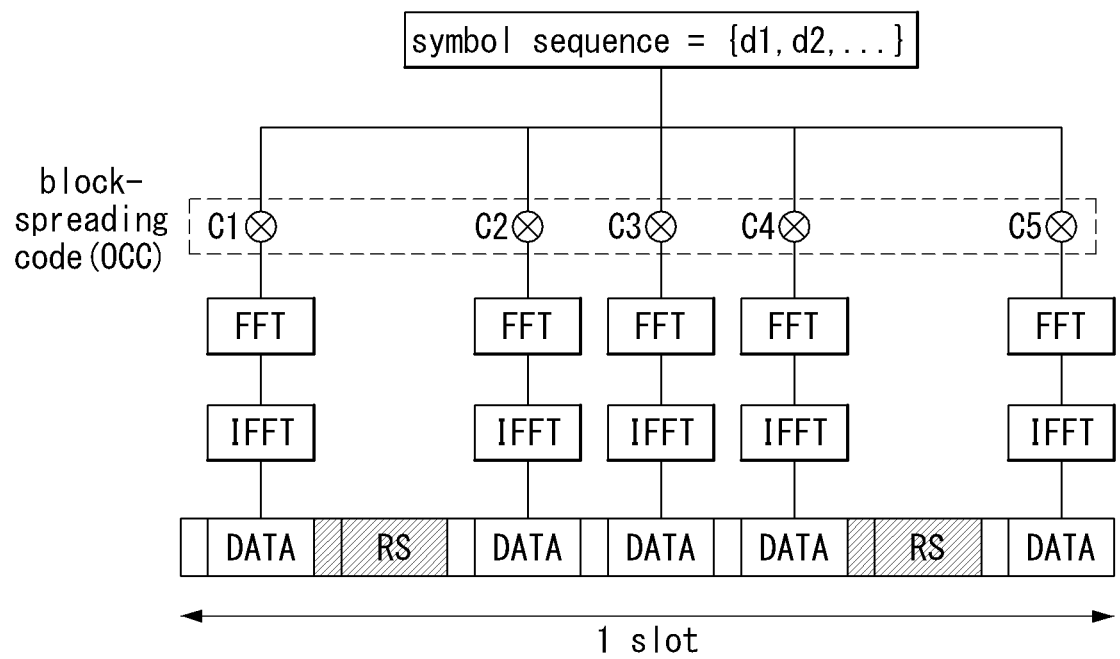

[FIG. 9]
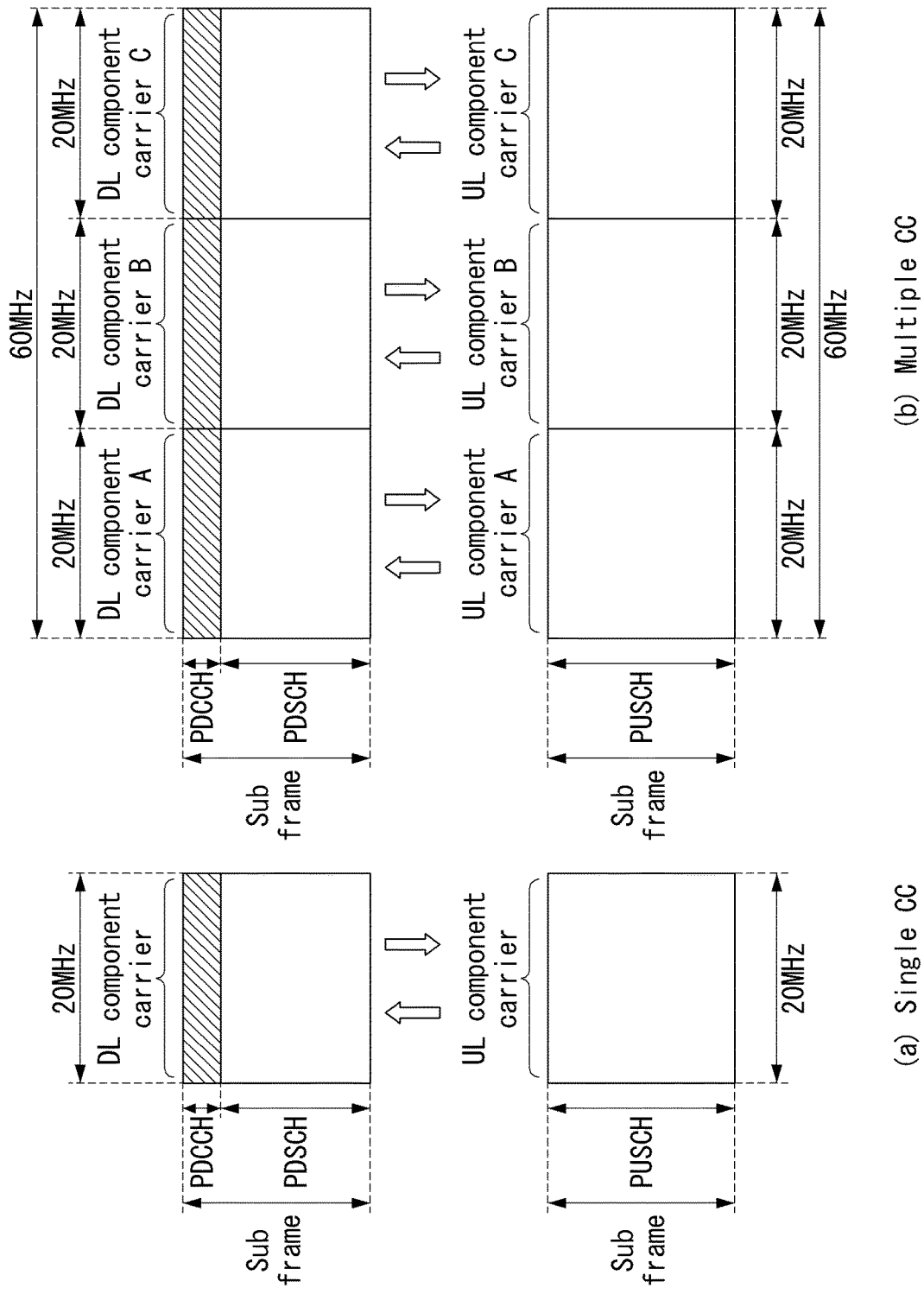

[FIG. 10]
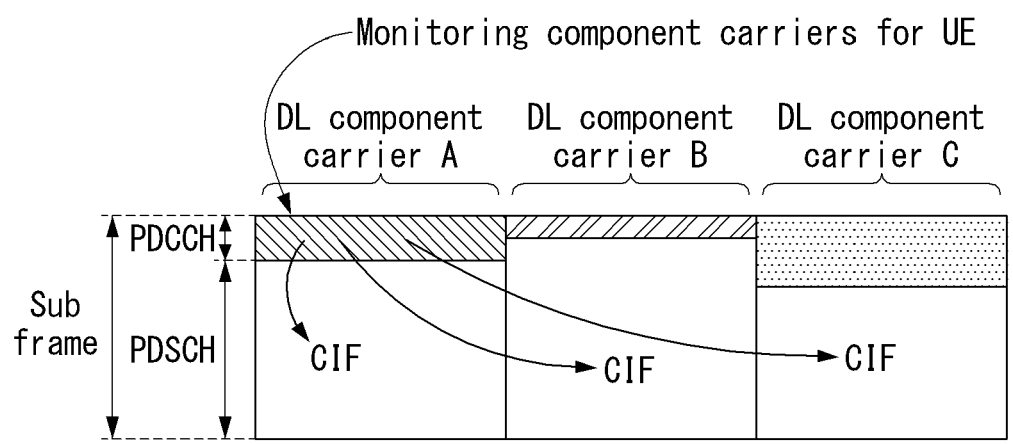

[FIG. 11]
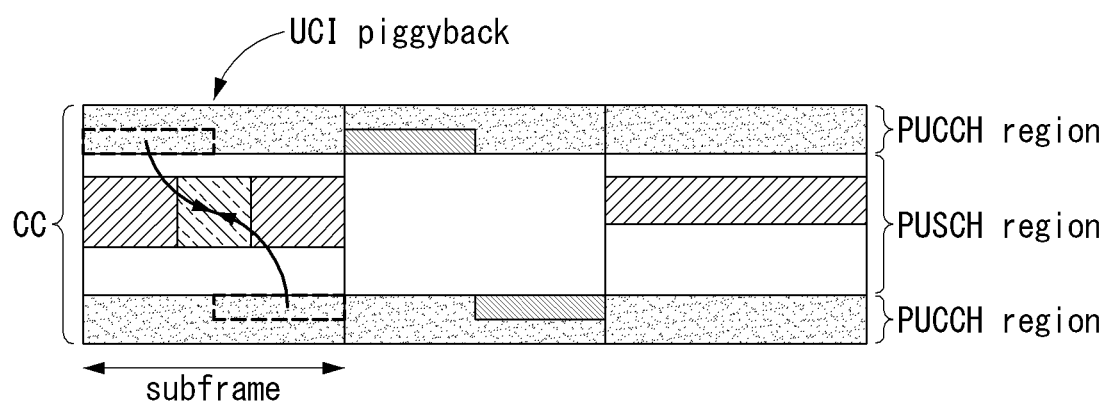

[FIG. 12]
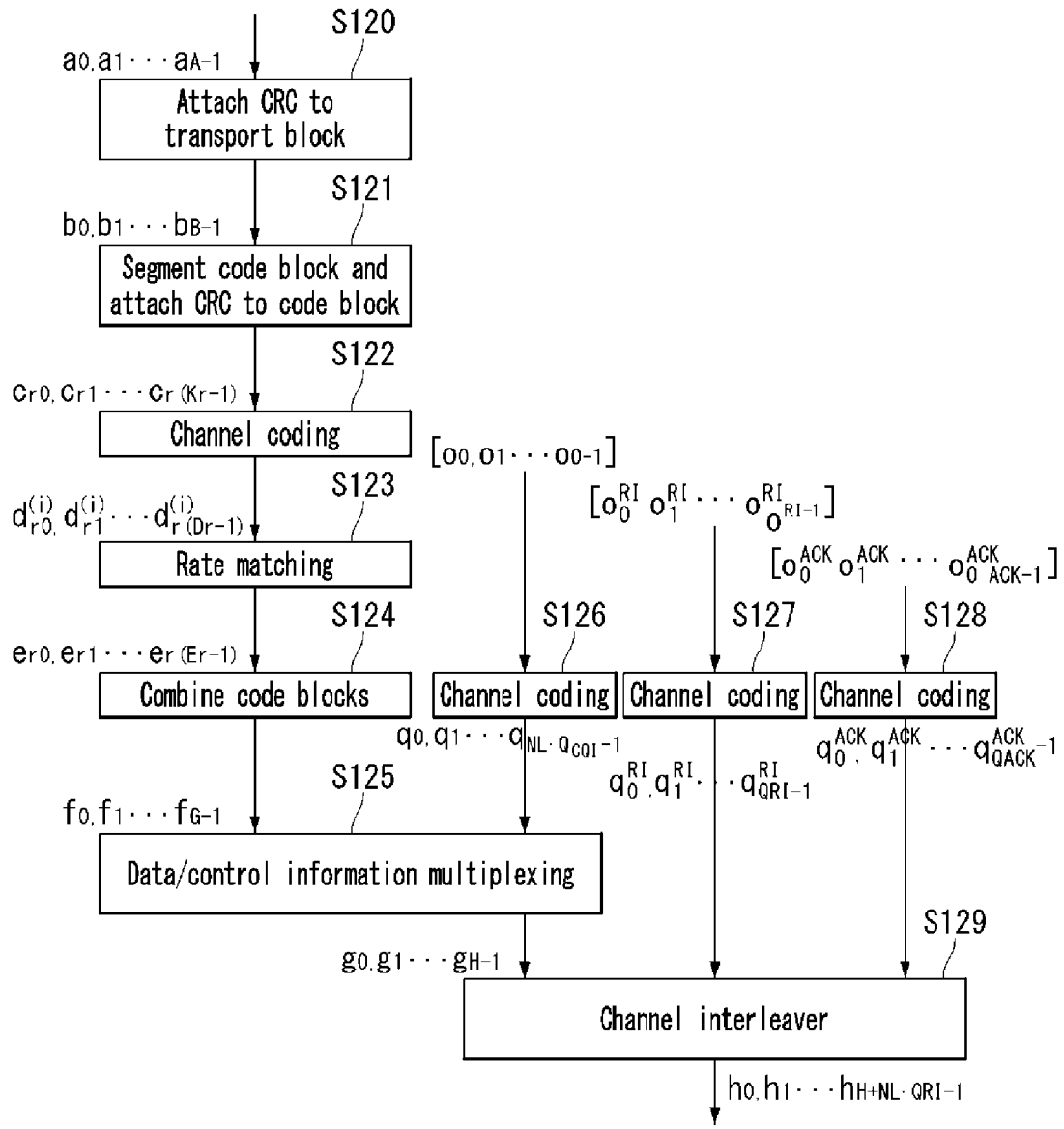

[FIG. 13]
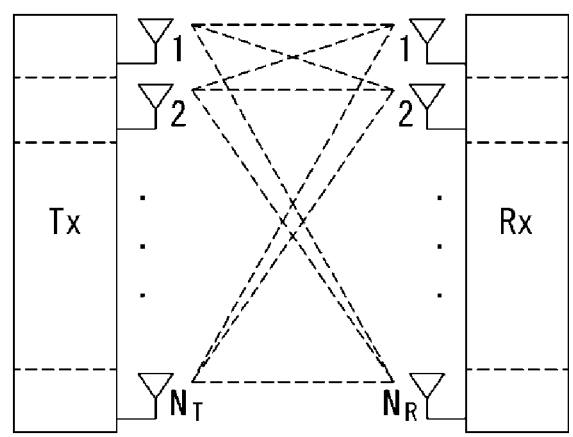

[FIG. 14]
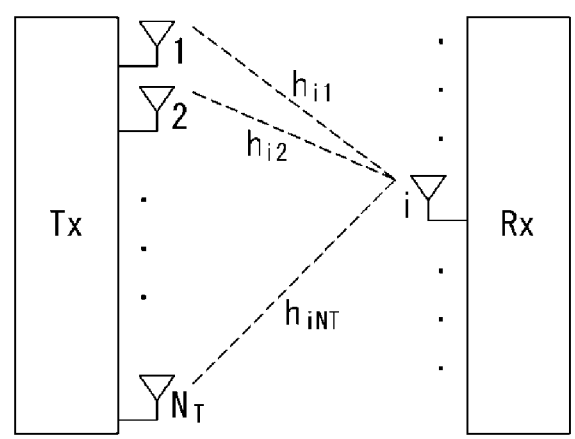

[FIG. 15]
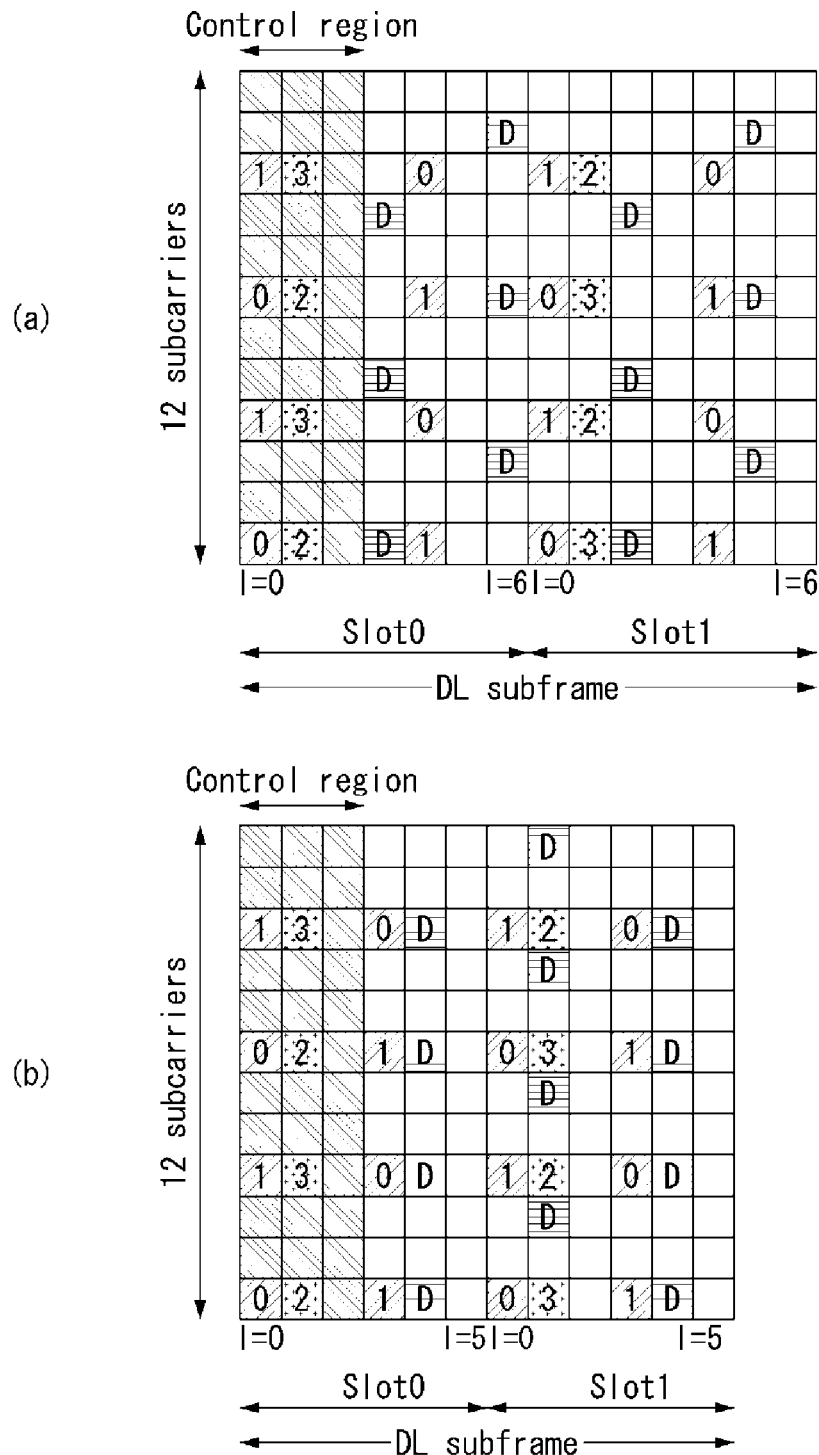

[FIG. 16]
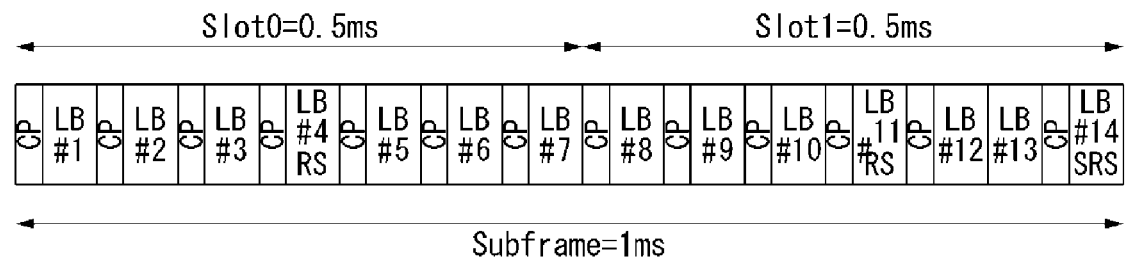

[FIG. 17]
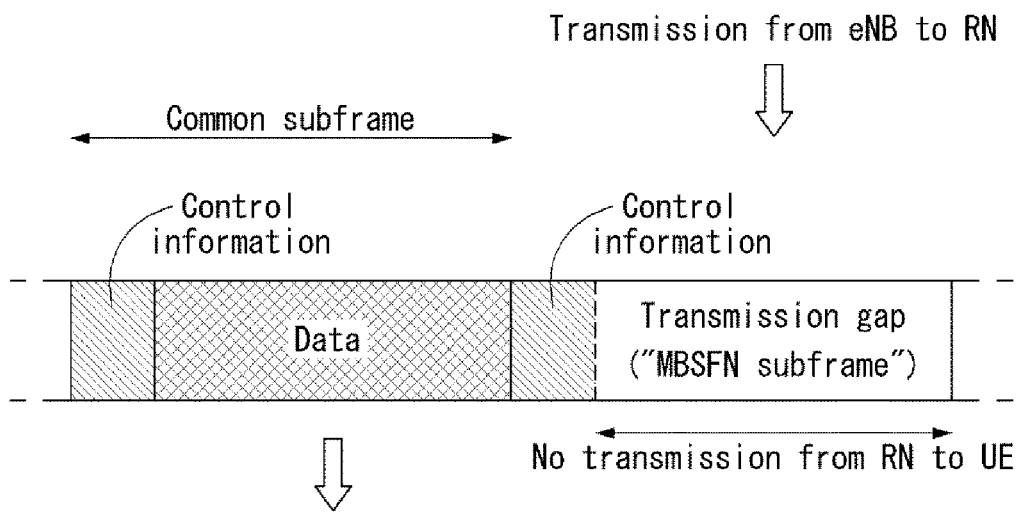

[FIG. 18]
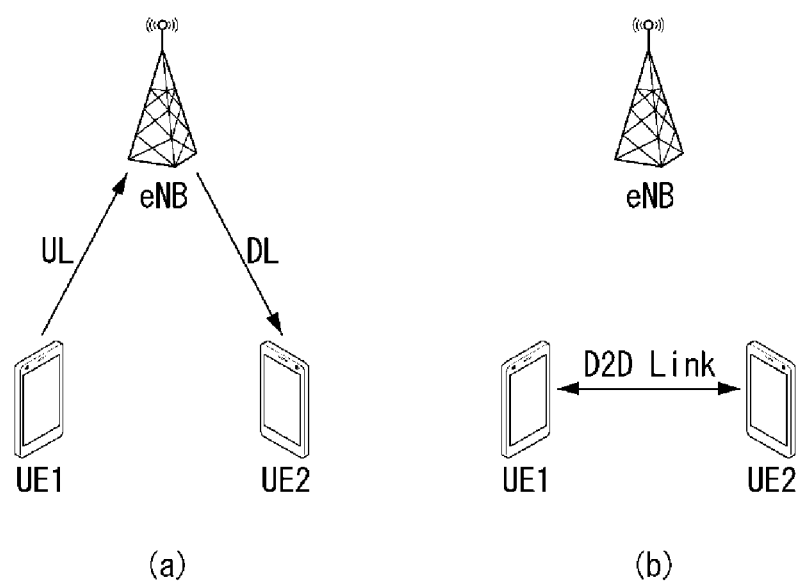

[FIG. 19]
(a) 
(b) 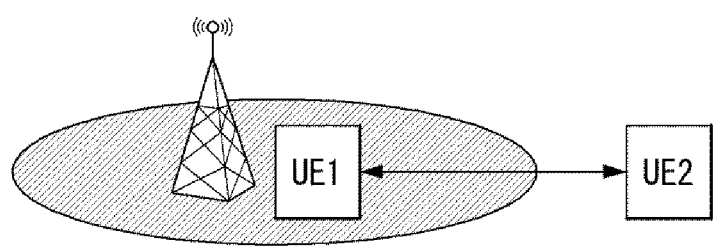
(c) 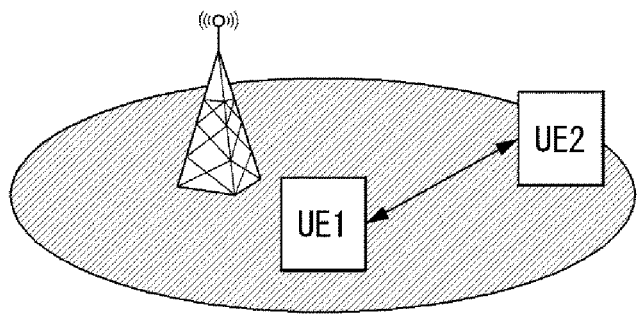
(d) 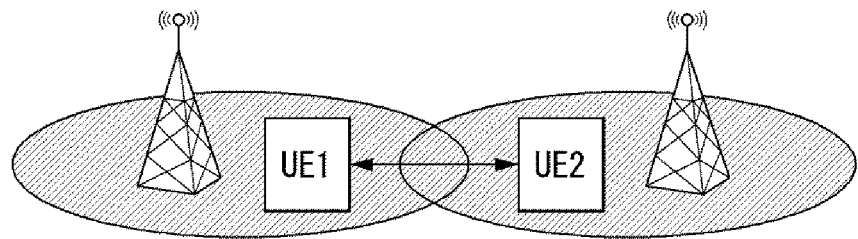

[FIG. 20]
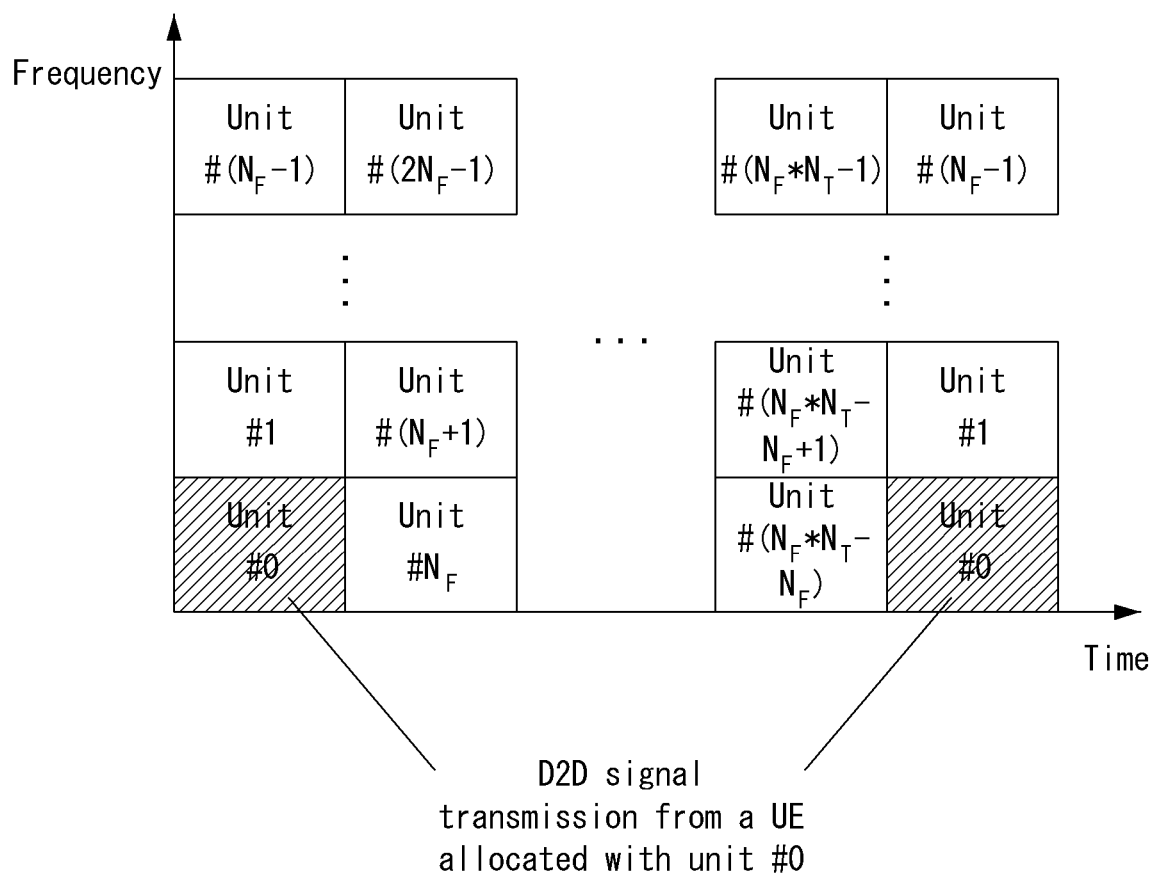

[FIG. 21]
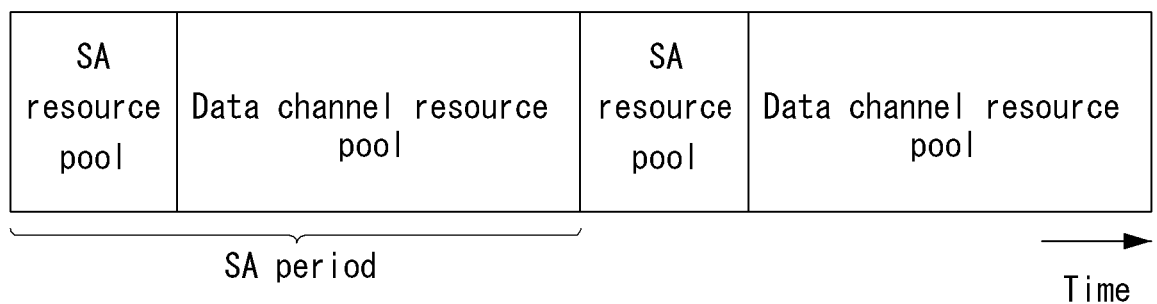

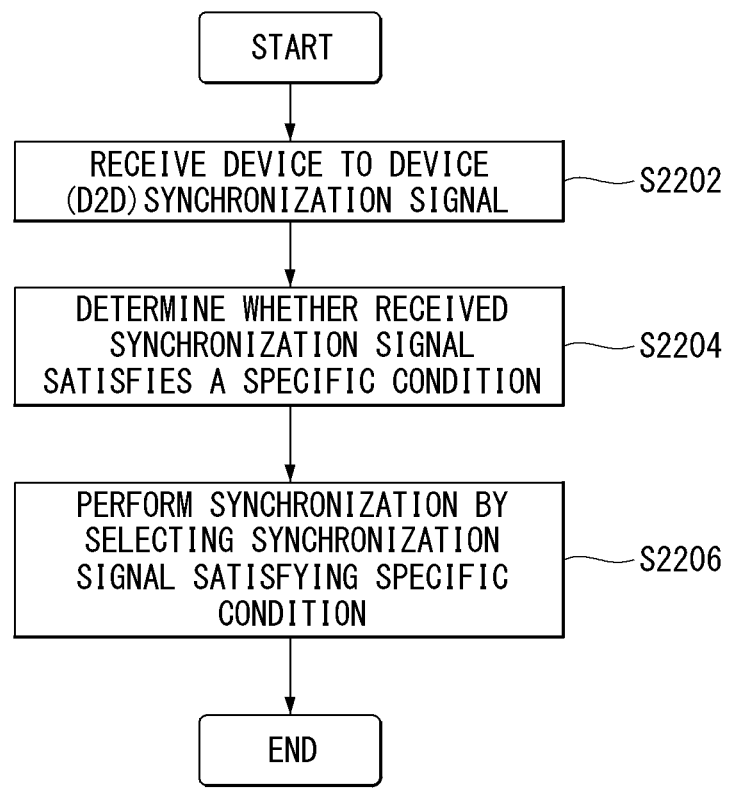
[FIG. 22]

[FIG. 23]
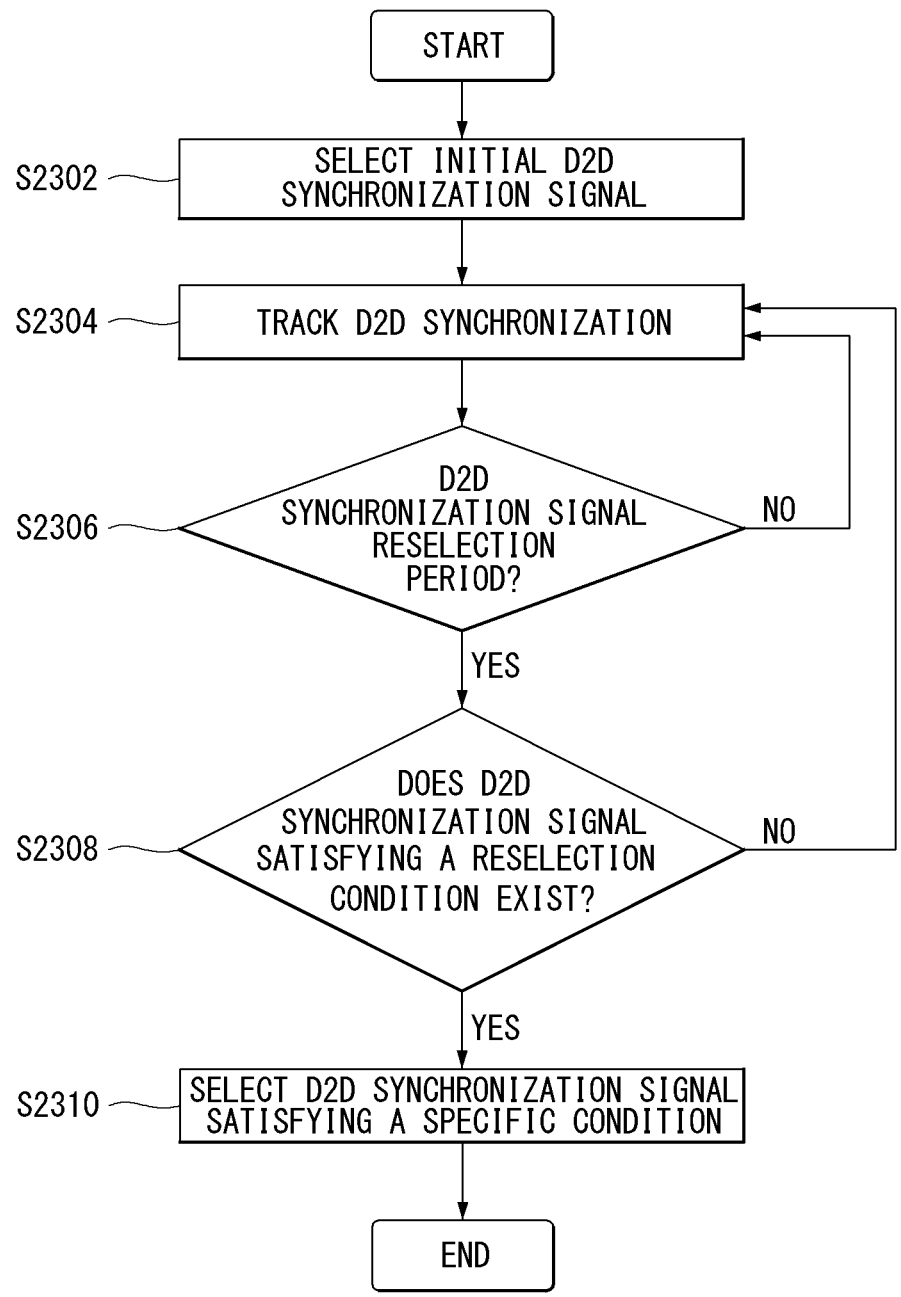

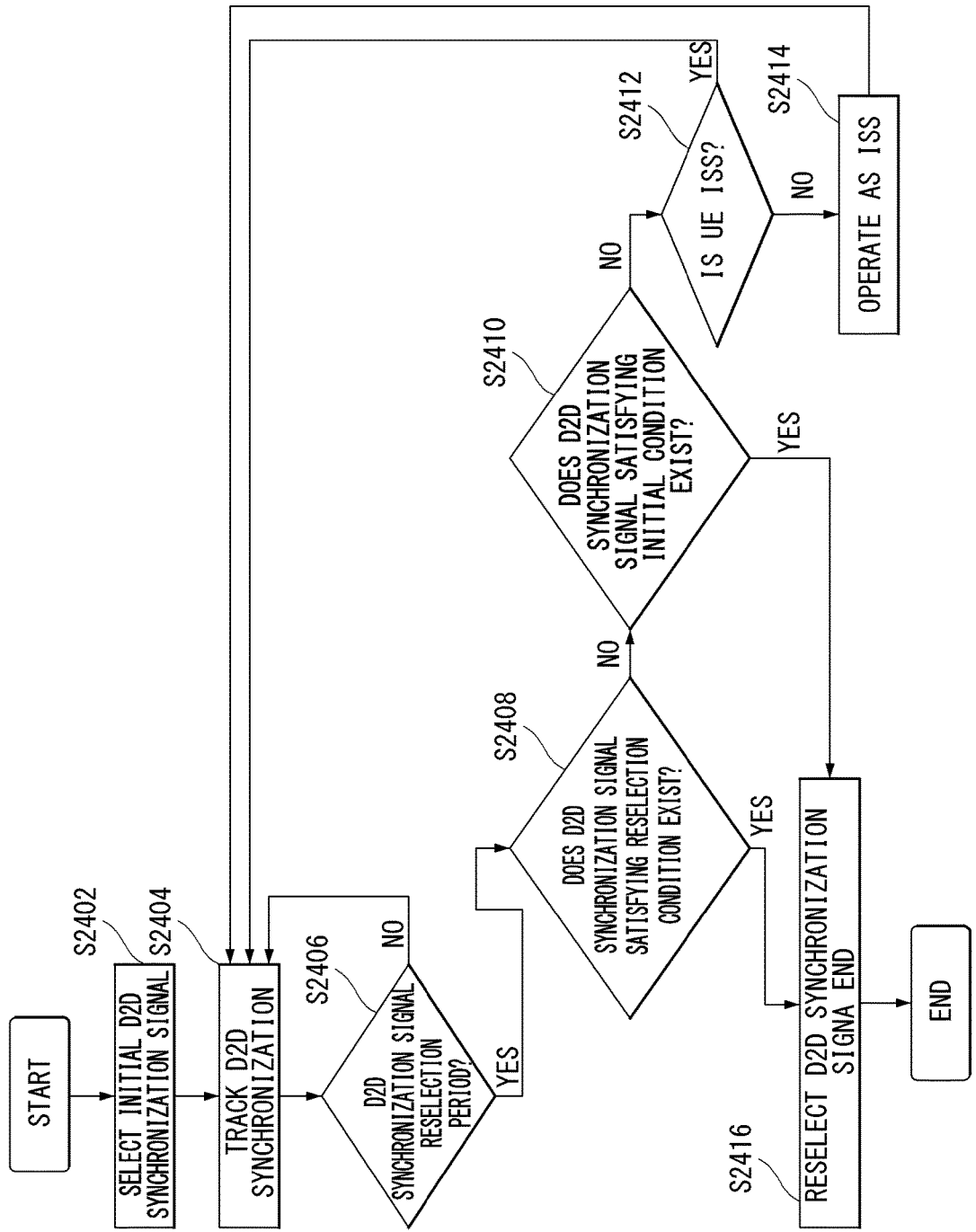

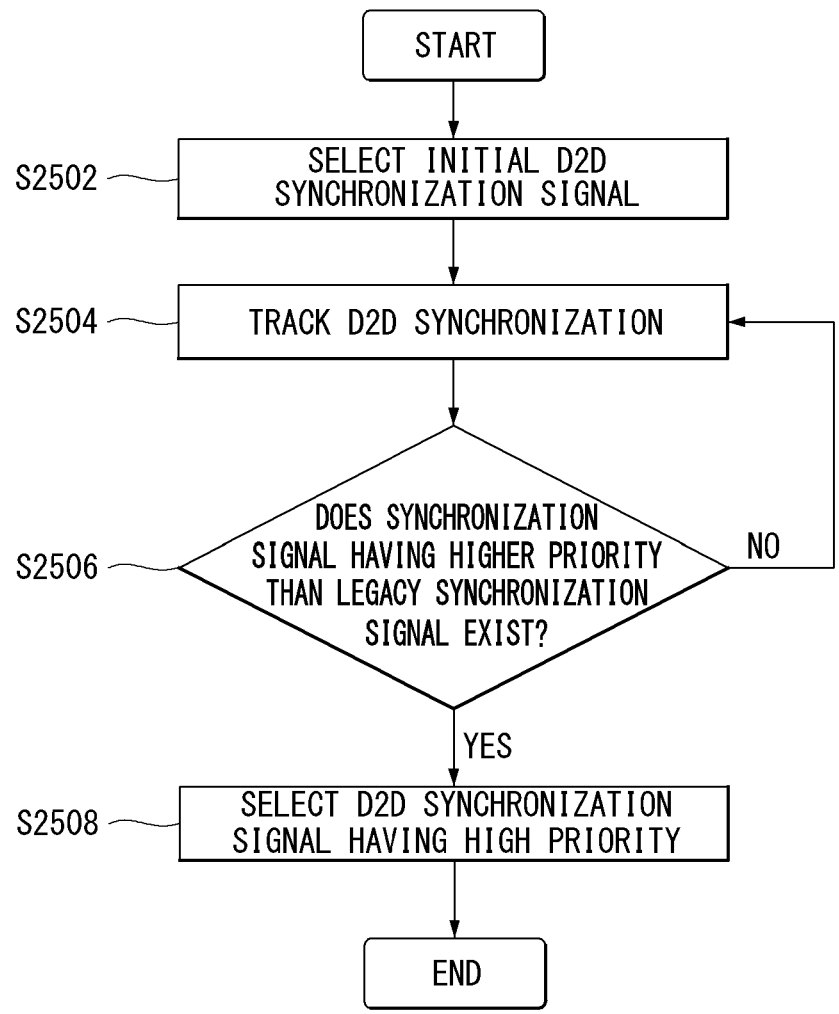
[FIG. 25]

[FIG. 26]
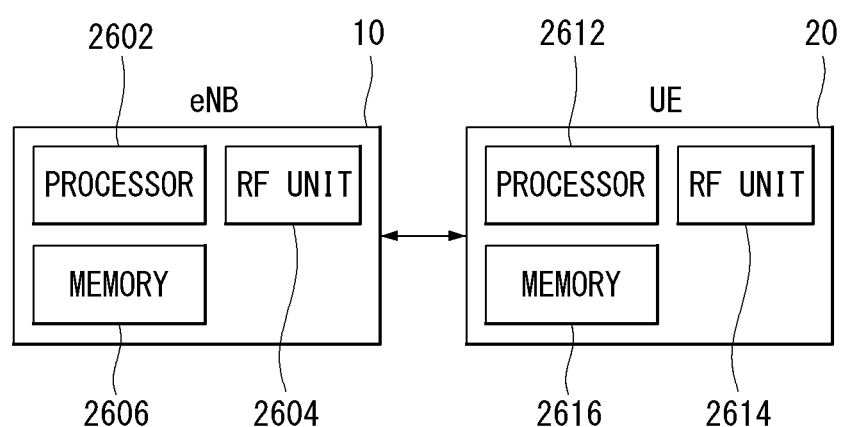

METHOD AND DEVICE FOR PERFORMING DEVICE-TO-DEVICE SYNCHRONIZATION IN WIRELESS COMMUNICATION SYSTEM

CROSS REFERENCE TO RELATED APPLICATIONS

This application is the National Phase of PCT International Application No. PCT/KR2015/008008, filed on Jul. 30, 2015, which claims priority under 35 U.S.C. 119(e) to U.S. Provisional Application No. 62/031,154, filed on Jul. 30, 2014, all of which are hereby expressly incorporated by reference into the present application.

TECHNICAL FIELD

The present invention relates to a synchronization method, and particularly, to a method and a device for reselecting synchronization in device-to-device communication.

BACKGROUND ART

Recently, with the supply of smart phones and tablet PCs, and the activation of high capacity multimedia communication, the mobile traffic has been abruptly increasing. The mobile traffic increase is anticipated as about two fold annually in the future. Since most of the mobile traffic is transmitted through a base station, communication service providers are confronted with a problem of significant traffic load right now. In this reason, the communication service providers have been increased network facilities in order to process the increasing traffic and commercialized the next generation mobile communication standard such as mobile WIMAX and long term evolution (LTE) that enables large amount of traffic to process efficiently in a hurry. However, in order to cope with the amount of traffic that will be more abruptly increased in the future, another solution is required.

The device-to-device (D2D) direct communication is a distributed communication technique through which the traffic between adjacent nodes is directly forwarded not using the infrastructure such as a base station. In the D2D communication environment, each node such as a mobile terminal searches another terminal that is physically near with, and transmits traffic after setting up a communication session. Since the D2D communication may solve the problem of traffic overload by distributing the traffic that is concentrated on a base station, the D2D communication is highly favored as an element technology of the next generation mobile communication technology after 4G technology. For this reason, the standard group such as 3GPP or IEEE has been promoted the establishment of D2D communication standard based on LTE-A or Wi-Fi, and companies such as Qualcomm, and etc. have been developing the D2D communication technology independently.

The D2D communication is expected to create a new communication service as well as it contributes to improve the performance of mobile communication system. In addition, it may support the social network services based on proximity, network games, or the like. As such, the D2D technology is expected to provide new services in various fields.

The D2D communication technology that has been already widely utilized includes the infrared communication, the ZigBee, the radio frequency identification (RFID), the near field communication (NFC) based on this. However, since these technologies support the communication of special object within very limited distance (about 1 m) only, these technologies cannot be classified as the D2D communication technology through which the traffic of a base station is distributed, strictly.

DISCLOSURE

Technical Problem

An object of the present invention is to provide a method and a device for device-to-device synchronization in a wireless communication system.

Another object of the present invention is to provide a method and a device for selecting a synchronization signal for device to device communication in the wireless communication system.

Yet another object of the present invention is to provide a method and a device for reselecting the synchronization signal after selecting an initial synchronization signal for the device to device communication in the wireless communication system.

Still yet another object of the present invention is to provide a method and a device for reselecting the synchronization signal by comparing reception power with a threshold value indicating minimum reception power when selecting the synchronization signal after selecting the initial synchronization signal for the device to device communication in the wireless communication system.

Still yet another object of the present invention is to provide a method and a device for reselecting the synchronization signal through a threshold value larger than the selected initial synchronization signal when selecting the synchronization signal after selecting the initial synchronization signal for the device to device communication in the wireless communication system.

Still yet another object of the present invention is to provide a method and a device for reselecting the synchronization signal by comparing priorities when selecting the synchronization signal after selecting the initial synchronization signal for the device to device communication in the wireless communication system.

The technical objects of the present invention are not limited to the aforementioned technical objects, and other technical objects, which are not mentioned above, will be apparently appreciated by a person having ordinary skill in the art from the following description.

Technical Solution

In order to address the aforementioned problem, the present invention provides a method and a device for reselecting a synchronization signal in a wireless communication system supporting device-to-device direct communication.

In detail, according to an embodiment of the present invention, a method for reselecting a synchronization signal in a wireless communication system supporting device-to-device direct communication and the method includes: receiving a first synchronization signal from a second UE and a second synchronization signal from a third UE; comparing a first reception power level indicating reception power of the first synchronization signal and a second reception power level indicating the reception power of a second synchronization signal with a first threshold value indicating minimum reception power for reselecting a synchronization signal; and selecting the first synchronization signal or the second synchronization signal according to the comparison result, and the synchronization signal is a synchronization signal selected in the previous synchronization procedure.

Further, in the present invention, the first threshold value is larger than a second threshold value indicating the minimum reception power in the previously synchronization procedure.

In addition, in the present invention, in the selecting of the first synchronization signal or the second synchronization signal, a synchronization signal having a reception power level larger than the first threshold value is selected between the first reception power level and the second reception power level.

Moreover, in the present invention, in the selecting of the first synchronization signal or the second synchronization signal, when the first reception power level and the second reception power level are larger than the first threshold value, a synchronization signal having a largest reception power level is selected.

Besides, in the present invention, in the selecting of the first synchronization signal or the second synchronization signal, when the first reception power level and the second reception power level are larger than the first threshold value, the first synchronization signal is selected.

In addition, in the present invention, the first threshold value is equal to the second threshold value indicating the minimum reception power in the previously synchronization procedure.

Further, the present invention provides a method including: receiving a first synchronization signal from a second UE and a second synchronization signal from a third UE; comparing a second reception power level indicating reception power of the second synchronization signal with a first threshold value indicating minimum reception power for selecting the synchronization signal and comparing a first reception power level indicating the reception power of a first synchronization signal with a second threshold value indicating minimum reception power in a previous synchronization procedure; and selecting the first synchronization signal or the second synchronization signal according to the comparison result, and the first synchronization signal is a synchronization signal selected in a previous synchronization procedure, and the first threshold value is greater than the second threshold value.

Moreover, the present invention provides a method including: receiving a first synchronization signal from a second UE and a second synchronization signal from a third UE; comparing a first priority indicating a priority of the first synchronization signal with a second priority indicating the priority of the second synchronization signal; and selecting a synchronization signal having a higher priority according to the comparison result, and the synchronization signal is a synchronization signal selected in a previous synchronization procedure.

Besides, in the selecting of the synchronization signal, when the second priority is higher than the first priority, the second synchronization signal is selected regardless of a device to device (D2D) synchronization signal selection period.

Moreover, In detail, the present invention provides a UE including: a communication unit transmitting and receiving a radio signal; and a processor functionally connected with the communication unit, and the processor performs a control to receive a first synchronization signal from a second UE and a second synchronization signal from a third UE, compare a first reception power level indicating reception power of the first synchronization signal and a second reception power level indicating the reception power of a second synchronization signal with a first threshold value indicating minimum reception power for selecting a synchronization signal, and select the first synchronization signal or the second synchronization signal according to the comparison result, and the synchronization signal is a synchronization signal selected in a previous synchronization procedure.

Further, in the present invention, the first threshold value is larger than a second threshold value indicating the minimum reception power in the previously synchronization procedure.

Moreover, in the present invention, the processor performs a control to select a synchronization signal having a reception power level larger than the first threshold value between the first reception power level and the second reception power level.

Besides, in the present invention, the processor performs a control to select a synchronization signal having a largest reception power level when the first reception power level and the second reception power level are larger than the first threshold value.

Further, in the present invention, the processor performs a control to select the first synchronization signal when the first reception power level and the second reception power level are larger than the first threshold value.

In addition, in the present invention, the first threshold value is equal to the second threshold value indicating the minimum reception power in the previously synchronization procedure.

Advantageous Effects

According to the method and the device for performing the device to device synchronization in the wireless communication system according to the present invention, the following effects are achieved.

According to the present invention, the synchronization signal can be efficiently selected through the method for selecting the synchronization signal in the device to device communication.

Further, according to the present invention, an optimal synchronization signal can be reselected through the method for selecting the synchronization signal in the device to device communication.

In addition, according to the present invention, the synchronization signal can be selected under a condition which is stricter than an initial synchronization signal selection condition through the method for selecting the synchronization signal in the device to device communication.

Moreover, according to the present invention, the synchronization signal can be selected with a threshold value larger than a threshold value of the initial synchronization signal selection through the method for selecting the synchronization signal in the device to device communication.

Besides, according to the present invention, a synchronization signal having a higher priority can be reselected through the method for selecting the synchronization signal in the device to device communication.

Effects which can be obtained in the present invention are not limited to the aforementioned effects and other unmentioned effects will be clearly understood by those skilled in the art from the following description.

DESCRIPTION OF DRAWINGS

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 illustrates an example of the shape in which PUCCH formats are mapped to the PUCCH region of uplink physical resource block in a wireless communication system to which the present invention may be applied.

FIG. 6 illustrates a structure of CQI channel in the case of normal CP in a wireless communication system to which the present invention may be applied.

FIG. 7 illustrates a structure of ACK/NACK channel in the case of normal CP in a wireless communication system to which the present invention may be applied.

FIG. 8 illustrates an example of generating and transmitting five SC-FDMA symbols during a slot in a wireless communication system to which the present invention may be applied.

FIG. 9 illustrates an example of component carrier and carrier aggregation in a wireless communication system to which the present invention may be applied.

FIG. 10 illustrates an example of subframe structure according to cross carrier scheduling in a wireless communication system to which the present invention may be applied.

FIG. 11 illustrates an example of transmission channel processing of UL-SCH in a wireless communication system to which the present invention may be applied.

FIG. 12 illustrates an example of signal processing process of uplink shared channel which is a transport channel in a wireless communication system to which the present invention may be applied.

FIG. 13 is a diagram of a general multiple input multiple output (MIMO) antenna communication system.

FIG. 14 is a diagram illustrating the channel from multiple transmission antennas to a single reception antenna.

FIG. 15 illustrates a reference signal pattern mapped to a downlink resource block pair in a wireless communication system to which the present invention may be applied.

FIG. 16 illustrates an uplink subframe including a sounding reference signal symbol in a wireless communication system to which the present invention may be applied.

FIG. 17 illustrates a relay node resource partition in a wireless communication system to which the present invention may be applied.

FIG. 18 is a diagram for conceptually describing a D2D communication in a wireless communication system to which the present invention may be applied.

FIG. 19 illustrates an example of various scenarios in a D2D communication to which the method proposed in the present invention may be applied.

FIGS. 20 and 21 illustrate one example of a method for allocating a resource in a D3D communication to which the method proposed in the present disclosure may be applied.

FIG. 22 is a flowchart schematically illustrating one example of a method for selecting a synchronization signal of device to device (D2D) according to an embodiment of the present invention.

FIG. 23 is a flowchart illustrating one example of a method for reselecting a synchronization signal of device to device (D2D) through a synchronization signal selection condition according to an embodiment of the present invention.

FIG. 24 is a flowchart illustrating another example of the method for reselecting the synchronization signal of device to device (D2D) through the synchronization signal selection condition according to the embodiment of the present invention.

FIG. 25 is a flowchart illustrating yet another example of the method for reselecting the synchronization signal of device to device (D2D) through the synchronization signal selection condition according to the embodiment of the present invention.

FIG. 26 illustrates one example of a block diagram of a wireless communication apparatus according to an embodiment of the present invention.

MODE FOR INVENTION

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 sub-carriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

PDCCH (Physical Downlink Control Channel)

Hereinafter, a PDCCH will be described in detail.

The control information transmitted via the PDCCH is referred to as downlink control information (DCI). The size and use of control information transmitted via the PDCCH may be changed according to DCI format or the size of control information may be changed according to coding rate.

Table 2 shows the DCI according to DCI format.

TABLE 2

| DCI format | Objectives |
| --- | --- |
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 2 above, the DCI format includes format 0 for scheduling of a PUSCH, format 1 for scheduling of one PDSCH codeword, format 1A for compact scheduling of one PDSCH codeword, format 1c for very compact scheduling of a DL-SCH, format 2 for PDSCH scheduling in a closed-loop spatial multiplexing mode, format 2A for PDSCH scheduling in an open-loop spatial multiplexing mode, formats 3 and 3A for transmission of a transmission power control (TPC) command for an uplink channel, and format 4 for PUSCH scheduling in a uplink cell in a multiple antenna port transmission mode.

DCI format 1A may be used for PDSCH scheduling regardless of the transmission mode of the UE.

Such DCI format is independently applicable per UE and PDCCHs of several UEs may be multiplexed within one subframe. The PDCCH is composed of an aggregate of one or several control channel elements (CCEs). The CCE is a logical allocation unit used to provide a PDCCH with a coding rate according to radio channel state. The CCE refers to a unit corresponding to 9 sets of REGs composed of four resource elements. The BS may use {1, 2, 4, 8} CCEs in order to configure one PDCCH signal and {1, 2, 4, 8} is referred to as a CCE aggregation level.

The number of CCEs used to transmit a specific PDCCH is determined by the BS according to channel state. The PDCCH configured according to UE is interleaved and mapped to a control channel region of each subframe by a CCE-to-RE mapping rule. The location of the PDCCH may depend on the number of OFDM symbols for a control channel of each subframe, the number of PHICH groups, transmit antenna, frequency shift, etc.

As described above, channel coding is performed independent of the multiplexed PDCCHs of the UEs and cyclic redundancy check (CRC) is applied. A unique identifier (UE ID) of each UE is masked to the CRC such that the UE receives the PDCCH thereof. However, in the control region allocated within the subframe, the BS does not provide the UE with information about where the PDCCH of the UE is located. Since the UE does not know the location of the PDCCH thereof and at which CCE aggregation level or with which DCI format the PDCCH thereof is transmitted, the UE monitors a set of PDCCH candidates within the subframe to detect the PDCCH thereof, in order to receive the control channel from the BS. This is referred to as blind decoding (BD).

The BD may also be referred to as blind detection or blind detect. The BD refers to a method of, at a UE, de-masking a UE ID thereof in a CRC portion, checking CRC errors, and determining whether a PDCCH is a control channel thereof.

Hereinafter, the information transmitted by DCI format 0 will be described.

DCI format 0 is used for PUSCH scheduling in one uplink cell.

Table 3 represents the information transmitted through DCI format 0.

TABLE 3

| Format 0 (Release 8) | Format 0 (Release 10) |
| --- | --- |
|  | Carrier Indicator (CIF) |
| Flag for format 0/format 1A differentiation | Flag for format 0/format 1A differentiation |
| Hopping flag (FH) | Hopping flag (FH) |
| Resource block assignment (RIV) | Resource block assignment (RIV) |
| MCS and RV | MCS and RV |
| NDI (New Data Indicator) | NDI (New Data Indicator) |
| TPC for PUSCH | TPC for PUSCH |
| Cyclic shift for DM RS | Cyclic shift for DM RS |
| UL index (TDD only) | UL index (TDD only) |
| Downlink Assignment Index (DAI) | Downlink Assignment Index (DAI) |
| CSI request (1 bit) | CSI request (1 or 2 bits: 2 bit is for multi carrier) |
|  | SRS request |
|  | Resource allocation type (RAT) |

Referring to Table 3 above, the following information is transmitted through DCI format 0.

1) Carrier indicator, which has a length of 0 or 3 bits.

2) Flag for DCI format 0 and DCI format 1A differentiation, which has a length of 1 bit, and 0 indicates DCI format 0 and 1 indicates DCI format 1A 3) Frequency hopping flag, which has 1 bit. This field may used for the multi-cluster allocation for the Most Significant bit (MSB) of the corresponding resource allocation if it is required.

4) Resource block assignment and hopping resource allocation, which has $\lceil \log_2(N_{RB}^{DL}(N_{RB}^{DL}++1)/2) \rceil$ bit.

Herein, in the case of PUSCH hopping in a single-cluster allocation, in order to acquire the value of $\tilde{n}_{PRB}(i)$, the most significant bits (MSBs) of $N_{UL\_hop}$ number are used. ($\lceil \log_2(N_{RB}^{UL}(N_{RB}^{UL}+1)/2) \rceil - N_{UL\_hop}$) bit provides the resource allocation of the first slot in the uplink subframe. In addition, in the case that there is no PUSCH hopping in the single-cluster allocation, ($\lceil \log_2(N_{RB}^{UL}(N_{RB}^{UL}+1)/2) \rceil$) bit provides the resource allocation in the uplink subframe. In addition, in the case that there is no PUSCH hopping in a multi-cluster allocation, the resource allocation information is obtained from the concatenation between the frequency hopping flag field and the hopping resource allocation field of the resource block allocation, and ($\lceil \log_2(N_{RB}^{UL}(N_{RB}^{UL}+1)/2) \rceil$) bit provides the resource allocation in the uplink subframe. In this case, value of P is determined by the number of downlink resource blocks.

5) Modulation and coding scheme (MCS), which has a length of 1 bit.

6) New data indicator, which has a length of 2 bits.

7) Transmit Power Control (TPC) command for PUSCH, which has a length of 2 bits.

8) Cyclic shift (CS) for a demodulation reference signal (DMRS) and an index of orthogonal cover/orthogonal cover code (OC/OCC), which has 3 bits.

9) Uplink index, which has a length of 2 bits. This field exits only for the TDD operation according to uplink-downlink configuration 0.

10) Downlink Assignment Index (DAD, which has a length of 2 bits. This field exits only for the TDD operation according to uplink-downlink configurations 1-6.

11) Channel State Information (CSI) request, which has a length of 1 bit or 2 bits. Herein, the field of 2 bits is applied only to the case that the corresponding DCI is mapped to the UE to which one or more downlink cells are configured by the Cell-RNTI (C-RNTI) in a UE-specific manner.

12) Sounding Reference Signal (SRS) request, which has a length of 0 bit or 1 bit. Herein, this field exists only in the case that the scheduling PUSCH is mapped by the C-RNTI in the UE-specific manner.

13) Resource allocation type, which has a length of 1 bit.

In the case that the number of information bits in DCI format 0 is smaller than the payload size (including additional padding bits) of DCI format 1A, 0 is added in order that DCI format 1A becomes identical to DCI format 0.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Physical Uplink Control Channel (PUCCH)

The uplink control information (UCI) transmitted through the PUCCH may include a scheduling request (SR), HARQ ACK/NACK information, and downlink channel measurement information.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 4 given below.

TABLE 4

| PUCCH Format | Uplink Control Information(UCI) |
|---|---|
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK.

In the case of an extended CP, PUCCH format 2 may be transmitted for transmitting the CQI and the HARQ ACK/NACK.

FIG. 5 illustrates one example of a type in which PUCCH formats are mapped to a PUCCH region of an uplink physical resource block in the wireless communication system to which the present invention can be applied.

In FIG. 5, $N_{RB}^{UL}$ represents the number of resource blocks in the uplink and $0, 1, \ldots, N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixedly mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

FIG. 6 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

PUCCH Channel Structure

PUCCH formats 1a and 1b are described.

In PUCCH format 1a and 1b, the CAZAC sequence having the length of 12 is multiplied by a symbol modulated by using a BPSK or QPSK modulation scheme. For example, a result acquired by multiplying a modulated symbol d(0) by a CAZAC sequence r(n) (n=0, 1, 2, ..., N−1) having a length of N becomes y(0), y(1), y(2), ..., y(N−1). y(0), ..., y(N−1) symbols may be designated as a block of symbols. The modulated symbol is multiplied by the CAZAC sequence and thereafter, the block-wise spread using the orthogonal sequence is adopted.

A Hadamard sequence having a length of 4 is used with respect to general ACK/NACK information and a discrete Fourier transform (DFT) sequence having a length of 3 is used with respect to the ACK/NACK information and the reference signal.

The Hadamard sequence having the length of 2 is used with respect to the reference signal in the case of the extended CP.

FIG. 7 illustrates a structure of an ACK/NACK channel in the case of a general CP in the wireless communication system to which the present invention can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

The block spreading technique is a scheme that modulates transmission of the control signal by using the SC-FDMA scheme unlike the existing PUCCH format 1 series or 2 series. As illustrated in FIG. 8, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 8 illustrates one example of generating and transmitting 5 SC-FDMA symbols during one slot in the wireless communication system to which the present invention can be applied.

In FIG. 8, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 8, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRCConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 9 illustrates examples of a component carrier and carrier aggregation in the wireless communication system to which the present invention can be applied.

FIG. 9a illustrates a single carrier structure used in an LTE system. The component carrier includes the DL CC and the UL CC. One component carrier may have a frequency range of 20 MHz.

FIG. 9b illustrates a carrier aggregation structure used in the LTE system. In the case of FIG. 9b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

FIG. 10 illustrates one example of a subframe structure depending on cross carrier scheduling in the wireless communication system to which the present invention can be applied.

Referring to FIG. 10, a case is illustrated, in which three DL CCs are associated with a DL subframe for an LTE-A terminal and DL CC'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

General ACK/NACK Multiplexing Method

In a situation in which the terminal simultaneously needs to transmit multiple ACKs/NACKs corresponding to multiple data units received from an eNB, an ACK/NACK multiplexing method based on PUCCH resource selection may be considered in order to maintain a single-frequency characteristic of the ACK/NACK signal and reduce ACK/NACK transmission power.

Together with ACK/NACK multiplexing, contents of ACK/NACK responses for multiple data units may be identified by combining a PUCCH resource and a resource of QPSK modulation symbols used for actual ACK/NACK transmission.

For example, when one PUCCH resource may transmit 4 bits and four data units may be maximally transmitted, an ACK/NACK result may be identified in the eNB as shown in Table 5 given below.

TABLE 5

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 5 given above, HARQ-ACK(i) represents an ACK/NACK result for an i-th data unit. In Table 5 given above, discontinuous transmission (DTX) means that there is no data unit to be transmitted for the corresponding HARQ-ACK(i) or that the terminal may not detect the data unit corresponding to the HARQ-ACK(i).

According to Table 5 given above, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided and b(0) and b(1) are two bits transmitted by using a selected PUCCH.

For example, when the terminal successfully receives all of four data units, the terminal transmits 2 bits (1,1) by using $n_{PUCCH,1}^{(1)}$.

When the terminal fails to decoding in first and third data units and succeeds in decoding in second and fourth data units, the terminal transmits bits (1,0) by using $n_{PUCCH,3}^{(1)}$.

In ACK/NACK channel selection, when there is at least one ACK, the NACK and the DTX are coupled with each other. The reason is that a combination of the PUCCH resource and the QPSK symbol may not all ACK/NACK states. However, when there is no ACK, the DTX is decoupled from the NACK.

In this case, the PUCCH resource linked to the data unit corresponding to one definite NACK may also be reserved to transmit signals of multiple ACKs/NACKs.

Validation of PDCCH for Semi-Persistent Scheduling

Semi-persistent scheduling (SPS) is a scheduling scheme that allocates the resource to the terminal to be persistently maintained during a specific time interval.

When a predetermined amount of data is transmitted for a specific time like a voice over Internet protocol (VoIP), since the control information need not be transmitted every data transmission interval for the resource allocation, the waste of the control information may be reduced by using the SPS scheme. In a so-called semi-persistent scheduling (SPS) method, a time resource domain in which the resource may be allocated to the terminal is preferentially allocated.

In this case, in a semi-persistent allocation method, a time resource domain allocated to a specific terminal may be configured to have periodicity. Then, a frequency resource domain is allocated as necessary to complete allocation of the time-frequency resource. Allocating the frequency resource domain may be designated as so-called activation. When the semi-persistent allocation method is used, since the resource allocation is maintained during a predetermined period by one-time signaling, the resource need not be repeatedly allocated, and as a result, signaling overhead may be reduced.

Thereafter, since the resource allocation to the terminal is not required, signaling for releasing the frequency resource allocation may be transmitted from the base station to the terminal. Releasing the allocation of the frequency resource domain may be designated as deactivation.

In current LTE, in which subframes the SPS is first transmitted/received through radio resource control (RRC) signaling for the SPS for the uplink and/or downlink is announced to the terminal. That is, the time resource is preferentially designated among the time and frequency resources allocated for the SPS through the RRC signaling.

In order to announce a usable subframe, for example, a period and an offset of the subframe may be announced. However, since the terminal is allocated with only the time resource domain through the RRC signaling, even though the terminal receives the RRC signaling, the terminal does not immediately perform transmission and reception by the SPS and the terminal allocates the frequency resource domain as necessary to complete the allocation of the time-frequency resource. Allocating the frequency resource domain may be designated as deactivation and releasing the allocation of the frequency resource domain may be designated as deactivation.

Therefore, the terminal receives the PDCCH indicating the activation and thereafter, allocate the frequency resource according to RB allocation information included in the received PDCCH and applies modulation and code rate depending on modulation and coding scheme (MCS) information to start transmission and reception according to the period and the offset of the subframe allocated through the RRC signaling.

Next, when the terminal receives the PDCCH announcing the deactivation from the base station, the terminal stops transmission and reception. When the terminal receives the PDCCH indicating the activation or reactivation after stopping the transmission and reception, the terminal resumes the transmission and reception again with the period and the offset of the subframe allocated through the RRC signaling by using the RC allocation, the MCS, and the like designated by the PDCCH. That is, the time resource is performed through the RRC signaling, but the signal may be actually transmitted and received after receiving the PDCCH indicating the activation and reactivation of the SPS and the signal transmission and reception stop after receiving the PDCCH indicating the deactivation of the SPS.

When all conditions described below are satisfied, the terminal may validate a PDCCH including an SPS indication. First, a CRC parity bit added for a PDCCH payload needs to be scrambled with an SPS C-RNTI and second, a new data indicator (NDI) field needs to be set to 0. Herein, in the case of DCI formats 2, 2A, 2B, and 2C, the new data indicator field indicates one activated transmission block.

In addition, when each field used in the DCI format is set according to Tables 4 and 5 given below, the validation is completed. When the validation is completed, the terminal recognizes that received DCI information is valid SPS activation or deactivation (alternatively, release). On the contrary, when the validation is not completed, the terminal recognizes that a non-matching CRC is included in the received DCI format.

Table 6 shows a field for validating the PDCCH indicating the SPS activation.

TABLE 6

|  | DCI format 0 | DCI format 1/1A | DCI format 2/2A/2B |
| --- | --- | --- | --- |
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 7 shows a field for validating the PDCCH indicating the SPS deactivation (alternatively, release).

TABLE 7

|  | DCI format 0 | DCI format 1A |
| --- | --- | --- |
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

When the DCI format indicates SPS downlink scheduling activation, a TPC command value for the PUCCH field may be used as indexes indicating four PUCCH resource values set by the upper layer.

PUCCH Piggybacking in Rel-8 LTE

FIG. 11 illustrates one example of transport channel processing of a UL-SCH in the wireless communication system to which the present invention can be applied.

In a 3GPP LTE system (=E-UTRA, Rel. 8), in the case of the UL, single carrier transmission having an excellent peak-to-average power ratio (PAPR) or cubic metric (CM) characteristic which influences the performance of a power amplifier is maintained for efficient utilization of the power amplifier of the terminal. That is, in the case of transmitting the PUSCH of the existing LTE system, data to be transmitted may maintain the single carrier characteristic through DFT-precoding and in the case of transmitting the PUCCH, information is transmitted while being loaded on a sequence having the single carrier characteristic to maintain the single carrier characteristic. However, when the data to be DFT-precoded is non-contiguously allocated to a frequency axis or the PUSCH and the PUCCH are simultaneously transmitted, the single carrier characteristic deteriorates. Therefore, when the PUSCH is transmitted in the same subframe as the transmission of the PUCCH as illustrated in FIG. 11, uplink control information (UCI) to be transmitted to the PUCCH is transmitted (piggyback) together with data through the PUSCH.

Since the PUCCH and the PUSCH may not be simultaneously transmitted as described above, the existing LTE terminal uses a method that multiplexes uplink control information (UCI) (CQI/PMI, HARQ-ACK, RI, and the like) to the PUSCH region in a subframe in which the PUSCH is transmitted.

As one example, when the channel quality indicator (CQI) and/or precoding matrix indicator (PMI) needs to be transmitted in a subframe allocated to transmit the PUSCH, UL-SCH data and the CQI/PMI are multiplexed after DFT-spreading to transmit both control information and data. In this case, the UL-SCH data is rate-matched by considering a CQI/PMI resource. Further, a scheme is used, in which the control information such as the HARQ ACK, the RI, and the like punctures the UL-SCH data to be multiplexed to the PUSCH region.

FIG. 12 illustrates one example of a signal processing process of an uplink share channel of a transport channel in the wireless communication system to which the present invention can be applied.

Herein, the signal processing process of the uplink share channel (hereinafter, referred to as "UL-SCH") may be applied to one or more transport channels or control information types.

Referring to FIG. 12, the UL-SCH transfers data to a coding unit in the form of a transport block (TB) once every a transmission time interval (TTI).

A CRC parity bit $p_0, p_1, p_2, p_3, \ldots, p_{L-1}$ is attached to a bit of the transport block received from the upper layer (S1202). In this case. A represents the size of the transport block and L represents the number of parity bits. Input bits to which the CRC is attached are shown in $b_0, b_1, b_2, b_3, \ldots, b_{B-1}$. In this case, B represents the number of bits of the transport block including the CRC.

$b_0, b_1, b_2, b_3, \ldots, b_{B-1}$ is segmented into multiple code blocks (CBs) according to the size of the TB and the CRC is attached to multiple segmented CBs (S1204). Bits after the code block segmentation and the CRC attachment are shown in $c_{r0}, c_{r1}, c_{r2}, c_{r3}, \ldots, c_{r(K_r-1)}$. Herein, r represents No. (r=0, ..., C−1) of the code block and Kr represents the bit number depending on the code block r. Further, C represents the total number of code blocks.

Subsequently, channel coding is performed (S1206). Output bits after the channel coding are shown in $d_{r0}^{(i)}, d_{r1}^{(i)}, d_{r2}^{(i)}, d_{r3}^{(i)}, \ldots, d_{r(D_r-1)}^{(i)}$. In this case, i represents an encoded stream index and may have a value of 0, 1, or 2. Dr represents the number of bits of the i-th encoded stream for the code block r. r represents the code block number (r=0, ..., C−1) and C represents the total number of code blocks. Each code block may be encoded by turbo coding.

Subsequently, rate matching is performed (S1208). Bits after the rate matching are shown in $e_{r0}, e_{r1}, e_{r2}, e_{r3}, \ldots, e_{r(E_r-1)}$. In this case, r represents the code block number (r=0, ..., C−1) and C represents the total number of code blocks. Er represents the number of rate-matched bits of the r-th code block.

Subsequently, concatenation among the code blocks is performed again (S1210). Bits after the concatenation of the code blocks is performed are shown in $f_0, f_1, f_2, f_3, \ldots, f_{G-1}$. In this case, G represents the total number of bits encoded for transmission and when the control information is multiplexed with the UL-SCH, the number of bits used for transmitting the control information is not included.

Meanwhile, when the control information is transmitted in the PUSCH, channel coding of the CQI/PMI, the RI, and the ACK/NACK which are the control information is independently performed (S1214, S1216, and S1218). Since different encoded symbols are allocated for transmitting each control information, the respective control information has different coding rates.

In time division duplex (TDD), as an ACK/NACK feedback mode, two modes of ACK/NACK bundling and ACK/NACK multiplexing are supported by an upper-layer configuration. ACK/NACK information bits for the ACK/NACK bundling are constituted by 1 bit or 2 bits and ACK/NACK information bits for the ACK/NACK multiplexing are constituted by 1 to 4 bits.

After the concatenation among the code blocks in step S134, encoded bits $f_0, f_1, f_2, f_3, \ldots, f_{G-1}$ of the UL-SCH data and encoded bits $q_0, q_1, q_2, q_3, \ldots, q_{N_L \cdot Q_{CQI}-1}$ of the CQI/PMI are multiplexed (S125). A multiplexed result of the data and the CQI/PMI is shown in $g_0, g_1, g_2, g_3, \ldots, g_{H'-1}$. In this case, $g_i$ (i=0, ..., H'1) represents a column vector having a length of $(Q_m \cdot N_L)$. $H=(G+N_L \cdot Q_{CQI})$ and $H'=H/(N_L \cdot Q_m)$. $N_L$ represents the number of layers mapped to a UL-SCH transport block and H represents the total number of encoded bits allocated to $N_L$ transport layers mapped with the transport block for the UL-SCH data and the CQI/PMI information.

Subsequently, the multiplexed data and CQI/PMI, a channel encoded RI, and the ACK/NACK are channel-interleaved to generate an output signal (S1220).

MIMO (Multi-Input Multi-Output)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

FIG. 13 is a configuration diagram of a general multiple input multiple output (MIMO) communication system.

Referring to FIG. 13, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epchally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \quad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 13.

First, in respect to a transmission signal, when NT transmitting antennas are provided, since the maximum number of transmittable information is NT, NT may be expressed as a vector given below.

$$s = [s_1, s_2, \ldots, s_{N_T}]^T \quad \text{[Equation 2]}$$

Meanwhile, transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Further, ŝ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector ŝ of which the transmission power is adjusted is multiplied by a weight matrix W to constitute NT transmission signals x1, x2, . . . , xNT which are actually transmitted. Herein, the weight matrix serves to appropriately distribute the transmission information to the respective antennas according to a transmission channel situation, and the like. The transmission signals x1, x2, . . . , xNT may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, . . . , yNR of the respective antennas are expressed as a vector y as described below.

$$y=[y_1,y_2,\ldots,y_{N_R}]^T \quad \text{[Equation 6]}$$

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

FIG. 14 is a diagram illustrating a channel from multiple transmitting antennas to one receiving antenna.

As illustrated in FIG. 14, a channel which reaches receiving antenna I from a total of NT transmitting antennas may be expressed as below.

$$h_i^T=[h_{i1},h_{i2},\ldots,h_{iN_T}] \quad \text{[Equation 7]}$$

Further, all of channels passing through NR receiving antennas from NT transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Meanwhile, since additive white Gaussian noise (AWGN) is added after passing through a channel matrix H given above in an actual channel, white noises n1, n2, . . . , nNR added to NR receiving antennas, respectively are expressed as below.

$$n=[n_1,n_2,\ldots,n_{N_R}]^T \quad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited to rank(H)≤min($N_T$, $N_R$).

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

When the data is transmitted and received by using the MIMO antenna, a channel state between the transmitting antenna and the receiving antenna need to be detected in order to accurately receive the signal. Therefore, the respective transmitting antennas need to have individual reference signals.

The downlink reference signal includes a common RS (CRS) shared by all terminals in one cell and a dedicated RS (DRS) for a specific terminal. Information for demodulation and channel measurement may be provided by using the reference signals.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 15 illustrates a reference signal pattern mapped to a downlink resource block pair in the wireless communication system to which the present invention can be applied.

Referring to FIG. 15, as a wise in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 15a) and a length of 12 OFDM symbols in the case of an extended cyclic prefix (CP) (FIG. 15b). Resource elements (REs) represented as '0', '1', '2', and '3' in a resource block lattice mean the positions of the CRSs of antenna port indexes '0', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. Further, the CRS may be used to demodulate the channel quality information (CSI) and data.

The CRS is defined as various formats according to an antenna array at the transmitter side (base station). The 3GPP LTE system (for example, release-8) supports various antenna arrays and a downlink signal transmitting side has three types of antenna arrays of three single transmitting antennas, two transmitting antennas, and four transmitting antennas. When the base station uses the single transmitting antenna, a reference signal for a single antenna port is arrayed. When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad \text{[Equation 11]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 11, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents an modulo operation. The position of the reference signal varies depending on the $v_{shift}$ value in the frequency domain. Since $v_{shift}$ is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 12 shows the case of the normal CP and Equation 14 shows the case of the extended CP.

$$k = (k') \bmod N_{sc}^{RB} + N_{sc}^{RB} \cdot n_{PRB} \quad \text{[Equation 12]}$$

$$k' = \begin{cases} 4m' + v_{shift} & \text{if } l \in \{2, 3\} \\ 4m' + (2 + v_{shift}) & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l = \begin{cases} 0, 1 & \text{if } n_s \bmod 2 = 0 \\ 2, 3 & \text{if } n_s \bmod 2 = 1 \end{cases}$$

$$m = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 13]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 11 to 13 given above, k and p represent the subcarrier index and the antenna port, respectively. $N_{RB}^{DL}$, ns, and $N_{ID}^{cell}$ represent the number of RBs, the number of slot indexes, and the number of cell IDs allocated to the downlink, respectively. The position of the RS varies depending on the $v_{shift}$ value in terms of the frequency domain.

In Equations 13 and 14, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ is subordinated to the cell ID, the position of the reference signal has various frequency shift values according to the cell.

Sounding Reference Signal (SRS)

The SRS is primarily used for the channel quality measurement in order to perform frequency-selective scheduling and is not associated with transmission of the uplink data and/or control information. However, the SRS is not limited thereto and the SRS may be used for various other purposes for supporting improvement of power control and various start-up functions of terminals which have not been scheduled. One example of the start-up function may include an initial modulation and coding scheme (MCS), initial power control for data transmission, timing advance, and frequency semi-selective scheduling. In this case, the frequency semi-selective scheduling means scheduling that selectively allocates the frequency resource to the first slot of the subframe and allocates the frequency resource by pseudo-randomly hopping to another frequency in the second slot.

Further, the SRS may be used for measuring the downlink channel quality on the assumption that the radio channels between the uplink and the downlink are reciprocal. The assumption is valid particularly in the time division duplex in which the uplink and the downlink share the same frequency spectrum and are divided in the time domain.

Subframes of the SRS transmitted by any terminal in the cell may be expressed by a cell-specific broadcasting signal. A 4-bit cell-specific 'srsSubframeConfiguration' parameter represents 15 available subframe arrays in which the SRS may be transmitted through each radio frame. By the arrays, flexibility for adjustment of the SRS overhead is provided according to a deployment scenario.

A 16-th array among them completely turns off a switch of the SRS in the cell and is suitable primarily for a serving cell that serves high-speed terminals.

FIG. 16 illustrates an uplink subframe including a sounding reference signal symbol in the wireless communication system to which the present invention can be applied.

Referring to FIG. 16, the SRS is continuously transmitted through a last SC FDMA symbol on the arrayed subframes. Therefore, the SRS and the DMRS are positioned at different SC-FDMA symbols.

The PUSCH data transmission is not permitted in a specific SC-FDMA symbol for the SRS transmission and consequently, when sounding overhead is highest, that is, even when the SRS symbol is included in all subframes, the sounding overhead does not exceed approximately 7%.

Each SRS symbol is generated by a base sequence (random sequence or a sequence set based on Zadoff-Ch (ZC)) associated with a given time wise and a given frequency band and all terminals in the same cell use the same base sequence. In this case, SRS transmissions from a plurality of terminals in the same cell in the same frequency band and at the same time are orthogonal to each other by different cyclic shifts of the base sequence to be distinguished from each other.

SRS sequences from different cells may be distinguished for each other by allocating different base sequences to respective cells, but orthogonality among different base sequences is not assured.

Coordinated Multi-Point Transmission and Reception (COMP)

According to a demand of LTE-advanced, CoMP transmission is proposed in order to improve the performance of the system. The CoMP is also called co-MIMO, collaborative MIMO, network MIMO, and the like. It is anticipated that the CoMP will improves the performance of the terminal positioned at a cell edge and improve an average throughput of the cell (sector).

In general, inter-cell interference decreases the performance and the average cell (sector) efficiency of the terminal positioned at the cell edge in a multi-cell environment in which a frequency reuse index is 1. In order to alleviate the inter-cell interference, the LTE system adopts a simple passive method such as fractional frequency reuse (FFR) in the LTE system so that the terminal positioned at the cell edge has appropriate performance efficiency in an interference-limited environment. However, a method that reuses the inter-cell interference or alleviates the inter-cell interference as a signal (desired signal) which the terminal needs to receive is more preferable instead of reduction of the use of the frequency resource for each cell. The CoMP transmission scheme may be adopted in order to achieve the aforementioned object.

The CoMP scheme which may be applied to the downlink may be classified into a joint processing (JP) scheme and a coordinated scheduling/beamforming (CS/CB) scheme.

In the JP scheme, the data may be used at each point (base station) in a CoMP wise. The CoMP wise means a set of base stations used in the CoMP scheme. The JP scheme may be again classified into a joint transmission scheme and a dynamic cell selection scheme.

The joint transmission scheme means a scheme in which the signal is simultaneously transmitted through a plurality of points which are all or fractional points in the CoMP wise. That is, data transmitted to a single terminal may be simultaneously transmitted from a plurality of transmission points. Through the joint transmission scheme, the quality of the signal transmitted to the terminal may be improved regardless of coherently or non-coherently and interference with another terminal may be actively removed.

The dynamic cell selection scheme means a scheme in which the signal is transmitted from the single point through the PDSCH in the CoMP wise. That is, data transmitted to the single terminal at a specific time is transmitted from the single point and data is not transmitted to the terminal at another point in the CoMP wise. The point that transmits the data to the terminal may be dynamically selected.

According to the CS/CB scheme, the CoMP wise performs beamforming through coordination for transmitting the data to the single terminal. That is, the data is transmitted to the terminal only in the serving cell, but user scheduling/beamforming may be determined through coordination of a plurality of cells in the CoMP wise.

In the case of the uplink, CoMP reception means receiving the signal transmitted by the coordination among a plurality of points which are geographically separated. The CoMP scheme which may be applied to the uplink may be classified into a joint reception (JR) scheme and the coordinated scheduling/beamforming (CS/CB) scheme.

The JR scheme means a scheme in which the plurality of points which are all or fractional points receives the signal transmitted through the PDSCH in the CoMP wise. In the CS/CB scheme, only the single point receives the signal transmitted through the PDSCH, but the user scheduling/beamforming may be determined through the coordination of the plurality of cells in the CoMP wise.

Relay Node (RN)

The relay node transfers data transmitted and received between the base station and the terminal through two different links (a backhaul link and an access link). The base station may include a donor cell. The relay node is wirelessly connected to a wireless access network through the donor cell.

Meanwhile, in respect to the use of a band (spectrum) of the relay node, a case in which the backhaul link operates in the same frequency band as the access link is referred to as 'in-band' and a case in which the backhaul link and the access link operate in different frequency bands is referred to as 'out-band'. In both the cases of the in-band and the out-band, a terminal (hereinafter, referred to as a legacy terminal) that operates according to the existing LTE system (for example, release-8) needs to be able to access the donor cell.

The relay node may be classified into a transparent relay node or a non-transparent relay node according to whether the terminal recognizing the relay node. Transparent means a case in which it may not be recognized whether the terminal communicates with the network through the relay node and non-transparent means a case in which it is recognized whether the terminal communicates with the network through the relay node.

In respect to control of the relay node, the relay node may be divided into a relay node which is constituted as a part of the donor cell or a relay node that autonomously controls the cell.

The relay node which is constituted as a part of the donor cell may have a relay node identity (ID), but does not have a cell identity thereof.

When at least a part of radio resource management (RRM) is controlled by a base station to which the donor cell belongs, even though residual parts of the RRM are positioned at the relay node, the relay node is referred to as the relay node which is constituted as a part of the donor cell. Preferably, the relay node may support the legacy terminal. For example, various types including smart repeaters, decode-and-forward relay nodes, L2 (second layer) relay nodes, and the like and a type-2 relay node correspond to the relay node.

In the case of the relay node that autonomously controls the cell, the relay node controls one or a plurality of cells and unique physical layer cell identities are provided to the respective cells controlled by the relay node. Further, the respective cells controlled by the relay node may use the same RRM mechanism. In terms of the terminal, there is no difference between accessing the cell controlled by the relay node and accessing a cell controlled by a general base station. The cell controlled by the relay node may support the legacy terminal. For example, a self-backhauling relay node, an L3 (third layer) relay node, a type-1 relay node, and a type-1a relay node correspond to the relay node.

The type-1 relay node as the in-band relay node controls a plurality of cells and the plurality of respective cells are recognized as separate cells distinguished from the donor cell in terms of the terminal. Further, the plurality of respective cells may have physical cell IDs (they are defined in the LTE release-8) and the relay node may transmit a synchronization channel, the reference signal, and the like thereof. In the case of a single-cell operation, the terminal may receive scheduling information and an HARQ feedback directly from the relay node and transmit control channels (scheduling request (SR), CQI, ACK/NACK, and the like) thereof to the relay node. Further, the type-1 relay node is shown as a legacy base station (a base station that operates according to the LTE release-8 system) to the legacy terminals (terminal that operate according to the LTE release-8 system). That is, the type-1 relay node has the backward compatibility. Meanwhile, the terminals that operate according to the LTE-A system recognize the type-1 relay node as a base station different from the legacy base station to provide performance improvement.

The type-1a relay node has the same features as the type-1 relay node including operating as the out-band The operation of the type-1a relay node may be configured so that an influence on an L1 (first layer) operation is minimized or is not present.

The type-2 relay node as the in-band relay node does not have a separate physical cell ID, and as a result, a new cell is not formed. The type-2 relay node is transparent with respect to the legacy terminal and the legacy terminal may not recognize the presence of the type-2 relay node. The type-2 relay node may transmit the PDSCH, but at least does not transmit the CRS and the PDCCH.

Meanwhile, in order for the relay node to operate as the in-band, some resources in the time-frequency space needs to be reserved for the backhaul link and the resources may be configured not to be used for the access link. This is referred to as resource partitioning.

A general principle in the resource partitioning in the relay node may be described as below. Backhaul downlink and access downlink may be multiplexed in the time division multiplexing scheme on one carrier frequency (that is, only one of the backhaul downlink and the access downlink is activated at a specific time). Similarly, backhaul uplink and access uplink may be multiplexed in the time division multiplexing scheme on one carrier frequency (that is, only one of the backhaul uplink and the access uplink is activated at a specific time).

In the backhaul link multiplexing in the FDD, backhaul downlink transmission may be performed in a downlink frequency band and backhaul uplink transmission may be performed in an uplink frequency band. In the backhaul link multiplexing in the TDD, THE backhaul downlink transmission may be performed in the downlink subframe of the base station and the relay node and the backhaul uplink transmission may be performed in the uplink subframe of the base station and the relay node.

In the case of the in-band relay node, for example, when both backhaul downlink reception from the base station and access downlink transmission to the terminal are performed in the same frequency band, signal interference may occurs at a receiver side of the relay node by a signal transmitted from a transmitter side of the relay node. That is, the signal interference or RF jamming may occur at an RF front-end of the relay node. Similarly, even when both the backhaul uplink transmission to the base station and the access uplink reception from the terminal are performed in the same frequency band, the signal interference may occur.

Therefore, in order for the relay node to simultaneously transmit and receive the signal in the same frequency band, when sufficient separation (for example, the transmitting antenna and the receiving antenna are installed to be significantly geographically spaced apart from each other like installation on the ground and underground) between a received signal and a transmitted signal is not provided, it is difficult to implement the transmission and reception of the signal.

As one scheme for solving a problem of the signal interference, the relay node operates not transmit the signal to the terminal while receiving the signal from the donor cell. That is, a gap is generated in transmission from the relay node to the terminal and the terminal may be configured not to expect any transmission from the relay node during the gap. The gap may be configured to constitute a multicast broadcast single frequency network (MBSFN) subframe.

FIG. 17 illustrates a structure of relay resource partitioning in the wireless communication system to which the present invention can be applied.

In FIG. 17, in the case of a first subframe as a general subframe, a downlink (that is, access downlink) control signal and downlink data are transmitted from the relay node and in the case of a second subframe as the MBSFN subframe, the control signal is transmitted from the relay node from the terminal in the control region of the downlink subframe, but no transmission is performed from the relay node to the terminal in residual regions. Herein, since the legacy terminal expects transmission of the PDCCH in all downlink subframes (in other words, since the relay node needs to support legacy terminals in a region thereof to perform a measurement function by receiving the PDCCH every subframe), the PDCCH needs to be transmitted in all downlink subframes for a correct operation of the legacy terminal. Therefore, eve on a subframe (second subframe) configured for downlink (that is, backhaul downlink) transmission from the base station to the relay node, the relay does not receive the backhaul downlink but needs to perform the access downlink transmission in first N (N=1, 2, or 3) OFDM symbol intervals of the subframe. In this regard, since the PDCCH is transmitted from the relay node to the terminal in the control region of the second subframe, the backward compatibility to the legacy terminal, which is served by the relay node may be provided. In residual regions of the second subframe, the relay node may receive transmission from the base station while no transmission is performed from the relay node to the terminal. Therefore, through the resource partitioning scheme, the access downlink transmission and the backhaul downlink reception may not be simultaneously performed in the in-band relay node.

The second subframe using the MBSFN subframe will be described in detail. The control region of the second subframe may be referred to as a relay non-hearing interval. The relay non-hearing interval means an interval in which the relay node does not receive the backhaul downlink signal and transmits the access downlink signal. The interval may be configured by the OFDM length of 1, 2, or 3 as described above. In the relay node non-hearing interval, the relay node may perform the access downlink transmission to the terminal and in the residual regions, the relay node may receive the backhaul downlink from the base station. In this case, since the relay node may not simultaneously perform transmission and reception in the same frequency band, It takes a time for the relay node to switch from a transmission mode to a reception mode. Therefore, in a first partial interval of a backhaul downlink receiving region, a guard time (GT) needs to be set so that the relay node switches to the transmission/reception mode. Similarly, even when the relay node operates to receive the backhaul downlink from the base station and transmit the access downlink to the terminal, the guard time for the reception/transmission mode switching of the relay node may be set. The length of the guard time may be given as a value of the time domain and for example, given as a value of k (k≥1) time samples (Ts) or set to the length of one or more OFDM symbols. Alternatively, when the relay node backhaul downlink subframes are consecutively configured or according to a predetermines subframe timing alignment relationship, a guard time of a last part of the subframe may not be defined or set. The guard time may be defined only in the frequency domain configured for the backhaul downlink subframe transmission in order to maintain the backward compatibility (when the guard time is set in the access downlink interval, the legacy terminal may not be supported). In the backhaul downlink reception interval other than the guard time, the relay node may receive the PDCCH and the PDSCH from the base station. This may be expressed as a relay (R)-PDCCH and a relay-PDSCH (R-PDSCH) in a meaning of a relay node dedicated physical channel.

Channel State Information (CSI) Feed-Back

The MIMO scheme may be divided into an open-loop scheme and a closed-loop scheme. The open-loop MIMO scheme means that the transmitter side performs MIMO transmission without a feed-back of the channel state information from the MIMO receiver side. The closed-loop MIMO scheme means that the transmitter side performs the MIMO transmission by receiving the feed-back of the channel state information from the MIMO receiver side. In the closed-loop MIMO scheme, each of the transmitter side and the receiver side may perform the beamforming based on the channel state information in order to acquire a multiplexing gain of the MIMO transmitting antenna. The transmitter side (for example, the base station) may allocate an uplink control channel or an uplink share channel to the receiver side (for example, the terminal).

The channel state information (CSI) which is fed back may include the rank indicator (RI), the precoding matrix index (PMI), and the channel quality indicator (CQI).

The RI is information on the rank of the channel. The rank of the channel means the maximum number of layers (alternatively, streams) which may send different information through the same time-frequency resource. Since a rank value is primary determined by long-time fading of the channel, the RI may be generally fed back according to a longer period (that is, less frequently) than the PMI and the CQI.

The PMI is information on the precoding matrix used for transmission from the transmitter side and a value acquired by reflecting spatial characteristics of the channel. Precoding means mapping the transmission layer to the transmitting antenna and a layer-antenna mapping relationship may be determined by a precoding matrix. The PMI corresponds to a precoding matrix index of the base station, which the terminal prefers to based on a measurement value (metric) such as a signal-to-interference plus noise ratio (SINR), or the like. In order to reduce feed-back overhead of precoding information, a scheme may be used, in which the transmitter side and the receiver side previously share a codebook including various precoding matrices and feed back only an index indicating a specific precoding matrix.

The CQI is information indicating the channel quality or a channel intensity. The CQI may be expressed as a predetermined MCS combination. That is, the CQI which is fed back indicates a corresponding modulation scheme and a corresponding code rate. In general, the CQI becomes a value acquired by reflecting a received SINR which may be acquired when the base station configures a spatial channel by using the PMI.

In the system (for example, LTE-A system) supporting the extended antenna configuration, acquiring additional multi-user diversity by using a multi-user-MIMO (MU-MIMO) scheme is considered. In the MU-MIMO scheme, since an interference channel between terminals multiplexed in an antenna domain is present, when the base station performs downlink transmission by using the channel state information which one terminal among the multi users feeds back, the interference in another terminal needs to be prevented. Therefore, channel state information having higher accuracy needs to be fed back than a single-user-MIMO (SU-MIMO) scheme in order to correctly perform the MU-MIMO operation.

A new CSI feed-back scheme that enhances the CSI constituted by the RI, the PMI, and the CQI may be adopted in order to measure and report the more accurate channel state information. For example, the precoding information which the receiver side feeds back may be indicated by combining two PMIs. One (first PMI) among two PMIs may have an attribute of a long term and/or a wideband and be designated as W1. The other one (second PMI) among two PMIs may have an attribute of a short term and/or a subband and be designated as W2. A final PMI may be determined by a combination (alternatively, function) of W1 and W2. For example, when the final PMI is referred to as W, W may be defined as W=W1*W2 or W=W2*W1.

Herein, W1 reflects average frequency and/or temporal characteristics of the channel. In other words, W may be defined as the channel state information reflecting a characteristic of a long term channel on the time, reflecting a characteristic of a wideband channel on the frequency, or reflecting the characteristics of the long term channel on the time and the wideband channel on the frequency. In order to express the characteristics of W1 in brief, W1 is referred to as the channel state information (alternatively, long term-wideband PMI) of the long term and wideband attributes.

Meanwhile, W2 reflects a relatively more instantaneous channel characteristic than W1. In other words, W2 may be defined as the channel state information reflecting a characteristic of a short-term channel on the time, reflecting a characteristic of a subband channel on the frequency, or reflecting the characteristics of the short term channel on the time and the subband channel on the frequency. In order to express the characteristics of W2 in brief, W2 is referred to as the channel state information (alternatively, short term-subband PMI) of the short term and subband attributes.

In order to determine one final precoding matrix W from the information (for example, W1 and W2) of two different attributes indicating the channel state, separate codebooks (that is, a first codebook for W1 and a second codebook for W2) constituted by the precoding matrixes indicating the channel information of the respective attributes need to be configured. A type of the codebook configured as above may be referred to as a hierarchical codebook. Further, determining a codebook to be finally used by using the hierarchical codebook may be referred to as hierarchical codebook transformation.

In the case of using the code book, higher-accuracy channel feed-back is possible than in the case of using a single codebook. Single-cell MU-MIMO and/or multi-cell coordinated communication may be supported by using the high-accuracy channel feed-back.

Enhanced PMI for MU-MIMO or CoMP

In a next-generation communication standard such as LTE-A, in order to achieve high transmission rate, transmission schemes such as MU-MIMO and CoMP were proposed. In order to implement the improved transmission schemes, the UE needs to feedback complicated and various CSIs to the base station.

For example, in the MU-MIMO, when UE-A selects the PMI, a CSI feedback scheme which uploads desired PMI of the UE-A and the PMI (hereinafter, referred to as best companion PMI (BCPMI)) of the UE scheduled with the UE-A.

That is, in the precoding matrix codebook, when co-scheduled UE is used as a precoder, the BCPMI which gives less interference to the UE-A is calculated and additionally fed-back to the base station.

The base station MU-MIMO-schedules another UE preferring UE-A and best companion precoding matrix (BCPM) (precoding matrix corresponding to the BCPMI) precoding by using the information.

The BCPMI feedback scheme is divided into two of an explicit feedback and an implicit feedback according to presence and absence of the feedback payload.

First, there is the explicit feedback scheme with the feedback payload.

In the explicit feedback scheme, the UE-A determines the BCPMI in the precoding matrix codebook and then feedbacks the determined BCPMI to the base station through a control channel. As one scheme, the UE-A selects an interference signal precoding matrix in which estimated SINR is maximized in the codebook and feedbacks the selected interference signal precoding matrix as the BCPMI value.

As an advantage of the explicit feedback, the BCPMI with more effective interference removal may be selected and transmitted. The UE determines the most effective value in the interference removal as the BCPMI by assuming all the codewords in the codebook one by one as the interference beam and comparing the metric such as SINR. However, as the codebook size is increased, the candidates of the BCPMI are increased, and thus the larger feedback payload size is required.

Second, there is the explicit feedback scheme without the feedback payload.

The implicit feedback scheme is a scheme that the UE-A does not search a codeword which receives less interference in the codebook to select the searched codeword as the BCPMI, but statically determines the BCPMI corresponding to the desired PMI when the desired PMI is determined. In this case, it may be preferred that the BCPM is constituted by orthogonal vectors in the determined desired PMI.

The reason is that the desired PM is set in a direction to maximize the channel gain of the channel H in order to maximize the received SINR and thus, it is effective in mitigating the interference the interference signal is selected by avoiding in the direction of the PM. When the channel H is analyzed as the plurality of independent channels through the singular value decomposition (SVD), the BCPMI determination scheme is further justified. 4×4 channel H may be decomposed through the SVD like the following Equation 14.

$$H = ULV'' = [u_1 \ u_2 \ u_3 \ u_4] \begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix} \begin{bmatrix} v_1^H \\ v_2^H \\ v_3^H \\ v_4^H \end{bmatrix}$$ [Equation 14]

In Equation 14, U, V are unitary matrices, ui, vi, and $\lambda_i$ represent a 4×1 left singular vector, a 4×1 right singular vector, and a singular value of the channel H, respectively and arranged in descending order of $\lambda_i > \lambda_{i+1}$. In the case of using the beamforming matrix V in the transmission terminal and the beamforming matrix $U^H$ in the reception terminal, all channel gains which may be theoretically obtained may be obtained without loss.

In the case of Rank 1, using the transmission beamforming vector v1 and the reception beamforming vector u1 may obtain the channel $|\lambda_1|^2$ to gain obtain optimal performance in terms of the SNR. For example, it is advantageous that the UE-A selects the most similar PM to v1 in the case of rank 1. Ideally, when the desired PM completely coincides with v1, the reception beam is set to u1 and the transmission beam of the interference signal is set to the PM in the orthogonal direction to completely remove the interference signal without loss in the desired signal. Actually, due to the quantization error, when the desired PM has a slight difference from v1, the transmission beam of the interference signal set in the orthogonal direction to the PM is no longer equal to the orthogonal beam to v1, and thus, the desired signal may not completely remove the interference signal without loss of the desired signal, but when the quantization error is small to help in controlling the interference signal.

As an example of the implicit feedback, in the case of using the LTE codebook, the BCPMI may be statically determined as the vector index orthogonal to the PMI.

It is assumed that the transmission antennas are four and the reception rank of the UE feedbacking the PMI is 1, three vectors orthogonal to the desired PMI are expressed as three BCPMIs.

For example, in the case of PMI=3, BCPMI=0, 1, 2. The PMI and the BCPMI represent the index of the 4×1 vector codeword in the codebook. The base station uses some or all as the precoder of the co-schedule UE by considering the BCPMI set(BCPMI=0, 1, 2) as the effective precoding index in the interference removal.

The implicit PMI has an advantage in that there is no additional feedback overhead because the desired PMI and the BCPMI set are mapped to 1:1. However, due to the quantization error of the desired PM (PM: precoding matrix corresponding to the PMI), the BCPM subordinated thereto may have optimal beam direction and error for the interference removal. When there is no quantization error, three BCPMs represent interference beam (ideal interference beam) which completely removes all the interference, but when there is the error, each BCPM occurs a difference from the ideal interference beam.

Further, the difference from the ideal interference beam of each BCPM is averagely the same, but may be different at a certain moment. For example, when desired PMI=3, it may be effective in removing the interference signal in order of BCPMI 0, 1, and 2, and the base station which does not know a relative error of BCPMI 0, 1, and 2 may communicate while the strong interference between the co-scheduled UEs is present by determining BCPMI 2 with the largest error with the ideal interference beam as the beam of the interference signal.

Cross-CC Scheduling and E-PDCCH Scheduling

Next, cross-CC scheduling and E-PDCCH scheduling will be described in brief.

In a legacy 3GPP LTE Rel-10 system, when a cross-CC scheduling operation in an aggregation situation for a plurality of component carriers (CC) (serving cell) is defined, one CC (i.e., scheduled CC) may be preconfigured so as to receive DL/UL scheduling only from one specific CC (i.e., scheduling CC) (that is, so as to receive a DL/UL grant PDCCH for the corresponding scheduled CC) and the corresponding scheduling CC may primarily perform the DL/UL scheduling therefor.

In other words, all SSs for the PDCCH that schedules a scheduling/scheduled CC having the cross-CC scheduling relationship may exist in a control channel region of the scheduling CC.

Meanwhile, in the LTE system, in the case of FDD DL carriers or TDD DL subframes, first n OFDM symbols of the subframe are used for transmission of a PDCCH, a PHICH, a PCFICH, and the like which are physical channels for transmission of various control information and residual OFDM symbols are used for transmission of a PDSCH.

In this case, the number of symbols used for transmission of a control channel in each subframe is transferred to the UE dynamically through the physical channels including the PCFICH, and the like or semi-statically through RRC signaling.

In this case, characteristically, a value of n may be set to 1 symbol to a maximum of 4 symbols according to subframe characteristics and system characteristics (FDD/TDD, system bandwidth, and the like).

Meanwhile, in the legacy LTE system, since there is a limit in which the PDCCH which is the physical channel for the DL/UL scheduling and transmission of various control information is transmitted through limited OFDM symbols, an enhanced PDCCH (i.e., E-PDCCH) may be introduced, which is more arbitrarily multiplexed with the PDSCH by the FDM/TDM scheme instead of a control channel transmitted through the OFDM symbol separated from the PDSCH like the PDCCH. E-PDCCH).

Quasi Co-Location

Next, Quasi co-location will be described in brief.

Hereinafter, a term called "quasi co-located (QC)" (alternatively, "quasi co-location (QC)") is defined and used as described below.

"If two antenna ports are "quasi co-located (QC)", the UE may assume that large-scale properties of the signal received from the first antenna port can be inferred from the signal received from the other antenna port". The "large-scale properties" mentioned in the above definition consist of some or all of;

Delay spread
Doppler spread
Frequency shift
Average received power
Received Timing Alternatively, the definition may be similarly used while being modified to an expression for the channel as described below.

"If two antenna ports are "quasi co-located (QC)", the UE may assume that large-scale properties of the channel over which a symbol on one antenna port is conveyed can be inferred from the channel over which a symbol on the other antenna port is conveyed". The "large-scale properties" mentioned in the above definition consist of some or all of:

Delay spread
Doppler spread
Doppler shift
Average gain
Average delay

In the present specification, the QC associated definitions are not distinguished.

That is, a QC concept may follow one of the definitions. Alternatively, as another similar form, the QC concept definition may be modified to a form (e.g., the UE may assume that the corresponding antenna ports are the antenna ports transmitted at the same transmission point, and the like) in which it may be assumed as if the antenna ports are transmitted at a co-location between antenna ports in which QC assumption is established.

According to the above definition, the same large-scale channel properties may not be assumed among the corresponding antenna ports (APs) with respect to "non-quasi-co-located (NQC) antenna ports".

That is, in this case, a conventional UE receiver needs to perform independent processing for each non-quasi-co-located (NQC) set with respect to each of timing acquisition and tracking, frequency offset estimation and compensation, delay estimation, and Doppler estimation. With respect to the APs which may assume the QC, the UE is advantageous of performing the following operations.

With respect to Delay spread & Doppler spread, the UE may similarly apply power-delay-profile, delay spread, Doppler spectrum, and Doppler spread estimation results for any one port to a Wiener filter used in channel estimation for another port.

With respect to Frequency shift & Received Timing, the UE may perform time and frequency synchronization for any one port and thereafter, apply the same synchronization to demodulation of another port.

With respect to Average received power, the UE may average RSRP measurements with respect to over two or more antenna ports.

HARQ Procedure

In a mobile communication system, one base station transmits/receives data to/from multiple terminals through a wireless channel environment in one cell/sector. In multiple carriers and a system operated in a similar form thereto, the base station receives packet traffic from a wired Internet network and transmits the received packet traffic to each terminal by using a determined communication scheme.

In this case, at which timing, at which frequency domain, and to which UE the base station determines to transmit the data is downlink scheduling.

Further, the packet traffic is transmitted through the wired Internet network by receiving and demodulating data transmitted from the UE by using a determined type of communication scheme. At which timing, at which frequency domain, and to which UE the base station determines to transmit the uplink data is uplink scheduling.

In general, UE having a good channel status transmits/receives data by using more time and more frequency resources.

Resources in the multiple carriers and the resources in the system operated in the similar form thereto may be generally classified into time and frequency domains. The resource may be defined as a resource block again and the resource is configured by predetermined N subcarriers and predetermined M subframes or per predetermined time. In this case, N and M may become 1.

One resource block is configured by using multiple subcarriers as one axis and configured by using the determined time unit as the other axis.

In the downlink, the base station schedules one or more resource blocks to UE selected according to a determined schedule rule and the base station transmits data by using a resource block allocated to the UE.

In the unlink, the base station schedules one or more resource blocks to the UE selected according to the determined schedule rule and the UE transmits data by using the allocated resource by the uplink.

An error control method when a frame is lost or damaged after transmitting the data after the scheduling includes an automatic repeat request (ARQ) scheme and a more developed type of hybrid ARQ (HARQ).

Primarily, in the ARQ scheme, arrival of an acknowledgment message ACK is waited after transmitting one frame, the acknowledgment message ACK is transmitted only when a receiving side normally receives the frame, a negative-ACK (NACK) message is transmitted when an error occurs in the frame, and a buffer at a receiving end deletes the information in a receiving frame in which the error occurs.

When a transmitting side receives an ACK signal, the transmitting side transmits the frame after receiving the ACK signal, but when the transmitting side receives the NACK message, the transmitting side retransmits the frame. Unlike the ARQ scheme, in the HARQ scheme, when the received frame may not be demodulated, the receiving end transmits the NACK message to the transmitting end, but the already received frame is stored in the buffer for a predetermined time and when the frame is retransmitted, the retransmitted frame and the previously received frame are combined with each other to increase receiving success rate.

In recent years, the HARQ scheme which is more efficient than the primary ARQ scheme is more widely used. The HARQ scheme also includes various types and may be generally divided into synchronous HARQ and asynchronous HARQ according to a retransmission timing and divided into a channel-adaptive scheme and a channel-non-adaptive scheme according to whether the channel status is reflected on the quantity of resources used for retransmission.

The synchronous HARQ scheme is a scheme in which when initial transmission is unsuccessful, subsequent retransmission is performed at a timing determined by the system. That is, in the case of the timing when the retransmission is performed, when it is assumed that the retransmission is performed every fourth time unit after the initial transmission is unsuccessful, the base station and the terminal have already made an appointment with each other with respect to the retransmission timing, and as a result, the timing need not be additionally announced.

However, when the data transmitting side receives the NACK message, the data transmitting side retransmits the frame every fourth time unit until receiving the ACK message.

On the contrary, in the asynchronous HARQ scheme, the retransmission timing may be newly scheduled or the retransmission may be performed through additional signaling. A timing when a frame which is previously unsuccessfully transmitted is retransmitted is varied by several factors including the channel status, and the like.

The channel-non-adaptive HARQ scheme is a scheme in which modulation of the frame, the number of used resource blocks, AMC, and the like during the retransmission are achieved as determined during the initial transmission, while, the channel-adaptive HARQ scheme is a scheme in which the modulation of the frame, the number of used resource blocks, AMC, and the like are varied according to the status of the channel.

For example, the scheme in which the transmitting side transmits the data by using 6 resource blocks during the initial transmission and thereafter, retransmits the data by using 6 resource blocks similarly even during the retransmission is the channel-non-adaptive scheme.

On the contrary, the scheme in which even though the transmission is initially performed by using 6 resource blocks, the retransmission is thereafter performed by using resource blocks of the number is larger or smaller than 6 resource blocks according to the channel status is the channel-adaptive scheme.

Four respective HARQ combinations may be achieved by the classification, but the HARQ scheme which is primarily used includes an asynchronous and channel-adaptive HARQ and a synchronous and channel-non-adaptive HARQ scheme.

In the asynchronous and channel-adaptive HARQ scheme, the retransmission timing and the quantity of used resources adaptively vary depending on the status of the channel to maximize retransmission efficiency, but overhead increases, and as a result, the asynchronous and channel-adaptive HARQ scheme is not generally considered for the uplink.

Meanwhile, in the synchronous and channel-non-adaptive HARQ scheme, since the timing and the resource allocation for the retransmission are appointed in the system, there is no overhead therefor, but when the synchronous and channel-non-adaptive HARQ scheme is used in the channel status in which a change is extreme, the retransmission efficiency is very low. In the case of the downlink in the current 3GPP LTE, as the asynchronous HARQ scheme, the synchronous HARQ scheme is used in the case of the uplink.

Meanwhile, for example, in the case of the downlink, until the data is transmitted through scheduling and thereafter, the information of the ACK/NACK is received from the UE and the data is transmitted again, a time latency occurs.

This is a latency which occurs due to a channel propagation delay and a time required for data decoding and data encoding. A method that transmits the data by using an independent HARQ process in order to transmit the data without a blank during the latency period is used.

For example, when a shortest period between the subsequent data transmissions is 7 subframes, if 7 independent processes are provided, the data may be transmitted with no blank. In the LTE, when the HARQ does not operate by the MIMO, a maximum of 8 processes may be allocated.

General D2D Communication

Generally, D2D communication is limitatively used as the term for communication between objects or object intelligent communication, but the D2D communication in the present invention may include all communication between various types of devices having a communication function such as a smart phone and a personal computer in addition to simple devices with a communication function.

FIG. 18 is a diagram for schematically describing the D2D communication in a wireless communication system to which the present invention may be applied.

FIG. 18A illustrates a communication scheme based on an existing base station eNB, and the UE1 may transmit the data to the base station on the uplink and the base station may transmit the data to the UE2 on the downlink. The communication scheme may be referred to as an indirect communication scheme through the base station. In the indirect communication scheme, a Un link (referred to as a backhole link as a link between base stations or a link between the base station and the repeater) and/or a Uu link (referred to as an access link as a link between the base station and the UE or a link between the repeater and the UE) which are defined in the existing wireless communication system may be related.

FIG. 18B illustrates a UE-to-UE communication scheme as an example of the D2D communication, and the data exchange between the UEs may be performed without passing through the base station. The communication scheme may be referred to as a direct communication scheme between devices. The D2D direct communication scheme has advantages of reducing latency and using smaller wireless resources as compared with the existing indirect communication scheme through the base station.

FIG. 19 illustrates examples of various scenarios of the D2D communication to which the method proposed in the specification may be applied.

The D2D communication scenario may be divided into (1) an out-of-coverage network, (2) a partial-coverage network, and (3) in-coverage network according to whether the UE1 and the UE2 are positioned in coverage/out-of-coverage.

The in-coverage network may be divided into an in-coverage-single-cell and an in-coverage-multi-cell according to the number of cells corresponding to the coverage of the base station.

FIG. 19a illustrates an example of an out-of-coverage network scenario of the D2D communication.

The out-of-coverage network scenario means perform the D2D communication between the D2D UEs without control of the base station.

In FIG. 19a, only the UE1 and the UE2 are present and the UE1 and the UE2 may directly communicate with each other.

FIG. 19b illustrates an example of a partial-coverage network scenario of the D2D communication.

The partial-coverage network scenario means performing the D2D communication between the D2D UE positioned in the network coverage and the D2D UE positioned out of the network coverage.

In FIG. 19b, it may be illustrated that the D2D UE positioned in the network coverage and the D2D UE positioned out of the network coverage communicate with each other.

FIG. 19c illustrates an example of the in-coverage-single-cell and FIG. 19d illustrates an example of the in-coverage-multi-cell scenario.

The in-coverage network scenario means that the D2D UEs perform the D2D communication through the control of the base station in the network coverage.

In FIG. 19c, the UE1 and the UE2 are positioned in the same network coverage (alternatively, cell) under the control of the base station.

In FIG. 19d, the UE1 and the UE2 are positioned in the network coverage, but positioned in different network coverages. In addition, the UE1 and the UE2 performs the D2D communication under the control of the base station managing the network coverage.

Here, the D2D communication will be described in more detail.

The D2D communication may operate in the scenario illustrated in FIG. 19, but generally operate in the network coverage and out of the network coverage. The link used for the D2D communication (direct communication between the UEs) may be referred to as D2D link, directlink, or sidelink, but for the convenience of description, the link is commonly referred to as the sidelink.

The sidelink transmission may operate in uplink spectrum in the case of the FDD and in the uplink (alternatively, downlink) subframe in the case of the TDD. For multiplexing the sidelink transmission and the uplink transmission, time division multiplexing (TDM) may be used.

The sidelink transmission and the uplink transmission do not simultaneously occur. In the uplink subframe used for the uplink transmission and the sidelink subframe which partially or entirely overlaps with UpPTS, the sidelink transmission does not occur. Alternatively, the transmission and the reception of the sidelink do not simultaneously occur.

A structure of a physical resource used in the sidelink transmission may be used equally to the structure of the uplink physical resource. However, the last symbol of the sidelink subframe is constituted by a guard period and not used in the sidelink transmission.

The sidelink subframe may be constituted by extended CP or normal CP.

The D2D communication may be largely divided into discovery, direct communication, and synchronization.

1) Discovery

The D2D discovery may be applied in the network coverage. (including inter-cell and intra-cell). Displacement of synchronous or asynchronous cells may be considered in the inter-cell coverage. The D2D discovery may be used for various commercial purposes such as advertisement, coupon issue, and finding friends to the UE in the near area.

When the UE 1 has a role of the discovery message transmission, the UE 1 transmits the discovery message and the UE 2 receives the discovery message. The transmission and the reception of the UE 1 and the UE 2 may be reversed. The transmission from the UE 1 may be received by one or more UEs such as UE2.

The discovery message may include a single MAC PDU, and here, the single MAC PDU may include a UE ID and an application ID.

A physical sidelink discovery channel (PSDCH) may be defined as the channel transmitting the discovery message. The structure of the PSDCH channel may reuse the PUSCH structure.

A method of allocating resources for the D2D discovery may use two types Type 1 and Type 2.

In Type 1, eNB may allocate resources for transmitting the discovery message by a non-UE specific method.

In detail, a wireless resource pool for discovery transmission and reception constituted by the plurality of subframes is allocated at a predetermined period, and the discovery transmission UE transmits the next discovery message which randomly selects the specific resource in the wireless resource pool.

The periodical discovery resource pool may be allocated for the discovery signal transmission by a semi-static method. Setting information of the discovery resource pool for the discovery transmission includes a discovery period, the number of subframes which may be used for transmission of the discovery signal in the discovery period (that is, the number of subframes constituted by the wireless resource pool).

In the case of the in-coverage UE, the discovery resource pool for the discovery transmission is set by the eNB and may notified to the UE by using RRC signaling (for example, a system information block (SIB)).

The discovery resource pool allocated for the discovery in one discovery period may be multiplexed to TDM and/or FDM as a time-frequency resource block with the same size, and the time-frequency resource block with the same size may be referred to as a 'discovery resource'.

The discovery resource may be used for transmitting the discovery MAC PDU by one UE. The transmission of the MAC PDU transmitted by one UE may be repeated (for example, repeated four times) contiguously or non-contiguously in the discovery period (that is, the wireless resource pool). The UE randomly selects the first discovery resource in the discovery resource set) which may be used for the repeated transmission of the MAC PDU and other discovery resources may be determined in relation with the first discovery resource. For example, a predetermined pattern is preset and according to a position of the first selected discovery resource, the next discovery resource may be determined according to a predetermined pattern. Further, the UE may randomly select each discovery resource in the discovery resource set which may be used for the repeated transmission of the MAC PDU.

In Type 2, the resource for the discovery message transmission is UE-specifically allocated. Type 2 is sub-divided into Type-2A and Type-2B again. Type-2A is a type in which the UE allocates the resource every transmission instance of the discovery message in the discovery period, and the type 2B is a type in which the resource is allocated by a semi-persistent method.

In the case of Type 2B, RRC_CONNECTED UE request allocation of the resource for transmission of the D2D discovery message to the eNB through the RRC signaling. In addition, the eNB may allocate the resource through the RRC signaling. When the UE is transited to a RRC_IDLE state or the eNB withdraws the resource allocation through the RRC signaling, the UE releases the transmission resource allocated last. As such, in the case of the type 2B, the wireless resource is allocated by the RRC signaling and activation/deactivation of the wireless resource allocated by the PDCCH may be determined.

The wireless resource pool for the discovery message reception is set by the eNB and may notified to the UE by using RRC signaling (for example, a system information block (SIB)).

The discovery message reception UE monitors all of the discovery resource pools of Type 1 and Type 2 for the discovery message reception.

2) Direct Communication

An application area of the D2D direct communication includes in-coverage and out-of-coverage, and edge-of-coverage. The D2D direct communication may be used on the purpose of public safety (PS) and the like.

When the UE 1 has a role of the direct communication data transmission, the UE 1 transmits direct communication data and the UE 2 receives direct communication data. The transmission and the reception of the UE 1 and the UE 2 may be reversed. The direct communication transmission from the UE 1 may be received by one or more UEs such as UE2.

The D2D discovery and the D2D communication are not associated with each other and independently defined. That is, in the groupcast and broadcast direct communication, the D2D discovery is not required. As such, when the D2D discovery and the D2D communication are independently defined, the UEs need to recognize the adjacent UEs. In other words, in the case of the groupcast and broadcast direct communication, it is not required that all of the reception UEs in the group are close to each other.

A physical sidelink shared channel (PSSCH) may be defined as a channel transmitting D2D direct communication data. Further, a physical sidelink control channel (PSCCH) may be defined as a channel transmitting control information (for example, scheduling assignment (SA) for the direct communication data transmission, a transmission format, and the like) for the D2D direct communication. The PSSCH and the PSCCH may reuse the PUSCH structure.

A method of allocating the resource for D2D direct communication may use two modes mode 1 and mode 2.

Mode 1 means a mode of scheduling a resource used for transmitting data or control information for D2D direct communication. Mode 1 is applied to in-coverage.

The eNB sets a resource pool required for D2D direct communication. Here, the resource pool required for D2D direct communication may be divided into a control information pool and a D2D data pool. When the eNB schedules the control information and the D2D data transmission resource in the pool set to the transmission D2D UE by using the PDCCH or the ePDCCH, the transmission D2D UE transmits the control information and the D2D data by using the allocated resource.

The transmission UE requests the transmission resource to the eNB, and the eNB schedules the control information and the resource for transmission of the D2D direct communication data. That is, in the case of mode 1, the transmission UE needs to be in an RRC_CONNECTED state in order to perform the D2D direct communication. The transmission UE transmits the scheduling request to the eNB and a buffer status report (BSR) procedure is performed so that the eNB may determine an amount of resource required by the transmission UE.

The reception UEs monitor the control information pool and may selectively decode the D2D data transmission related with the corresponding control information when decoding the control information related with the reception UEs. The reception UE may not decode the D2D data pool according to the control information decoding result.

Mode 2 means a mode in which the UE arbitrarily selects the specific resource in the resource pool for transmitting the data or the control information for D2D direct communication. In the out-of-coverage and/or the edge-of-coverage, the mode 2 is applied.

In mode 2, the resource pool for transmission of the control information and/or the resource pool for transmission of the D2D direct communication data may be preconfigured or semi-statically set. The UE receives the set resource pool (time and frequency) and selects the resource for the D2D direct communication transmission from the resource pool. That is, the UE may select the resource for the control information transmission from the control information resource pool for transmitting the control information. Further, the UE may select the resource from the data resource pool for the D2D direct communication data transmission.

In D2D broadcast communication, the control information is transmitted by the broadcasting UE. The control information explicitly and/or implicitly indicate the position of the resource for the data reception in associated with the physical channel (that is, the PSSCH) transporting the D2D direct communication data.

3) Synchronization

A D2D synchronization signal (alternatively, a sidelink synchronization signal) may be used so that the UE obtains time-frequency synchronization. Particularly, in the case of the out-of-coverage, since the control of the eNB is impossible, new signal and procedure for synchronization establishment between UEs may be defined.

The UE which periodically transmits the D2D synchronization signal may be referred to as a D2D synchronization source. When the D2D synchronization source is the eNB, the structure of the transmitted D2D synchronization signal may be the same as that of the PSS/SSS. When the D2D synchronization source is not the eNB (for example, the UE or the global navigation satellite system (GNSS)), a structure of the transmitted D2D synchronization signal may be newly defined.

The D2D synchronization signal is periodically transmitted for a period of not less than 40 ms. Each UE may have multiple physical-layer sidelink synchronization identities. The D2D synchronization signal includes a primary D2D synchronization signal (alternatively, a primary sidelink synchronization signal) and a secondary D2D synchronization signal (alternatively, a secondary sidelink synchronization signal).

Before transmitting the D2D synchronization signal, the UE may first search the D2D synchronization source. In addition, when the D2D synchronization source is searched, the UE may acquire the time-frequency synchronization through the D2D synchronization signal/sequence received from the searched D2D synchronization source. In addition, the corresponding UE may transmit the D2D synchronization signal.

Herein, the synchronization signal for the D2D synchronization is called D2DSS (PSS and SSS when the eNB transmits the synchronization signal).

Further, direct communication between two devices in the D2D communication is described as an example for clarity, but the scope of the present invention is not limited thereto and the same principle described in the present invention may be applied even to D2D communication among two or more plural devices.

As one of the D2D discovery schemes, is a scheme (hereinafter, referred to as 'distributed discovery') that allows all UE to perform the discovery by a distributed scheme is provided. The scheme that performs the D2D discovery in the distributed scheme means not a scheme that does not select resource selection at one place (for example, the eNB, the UE, or the D2D scheduling device) like the centralized scheme but a scheme in which all UE selects the discovery resource by autonomously determining the resource selection by the distributed scheme and transmits and receives the discovery message.

Hereinafter, in the present specification, a signal (alternatively, message) which the UEs periodically transmit for the D2D discovery may be referred to as the discovery message, the discovery signal, a beacon, and the like. Hereinafter, the discovery message, the discovery signal, the beacon, and the like are collectively called the discovery message.

In the distributed discovery, as a resource used for the UE to transmit and receive the discovery message, a dedicated resource may be periodically allocated apart from a cellular resource.

FIGS. 20 and 21 illustrate one example of a method for allocating a resource in a D3D communication to which the method proposed in the present disclosure may be applied.

FIG. 20 illustrates one example of a configuration of a resource unit and all frequency resources are divided into NF frequency resources and all time resources are divided into NT time resources, and as a result, a total of NF*NT resource units may be defined. In this case, the resource pool may be repeated every NT subframe.

As illustrated in FIG. 20, one resource unit may be shown periodically repeatedly and an index of a physical resource unit mapped with one logical resource unit may be changed in a predefined pattern with time in order to achieve a diversity effect in terms of the time or frequency.

In such a resource unit structure, the resource pool may represent an aggregation of resource units which the UE intending to transmit the D2D signal may use for transmitting the D2D signal.

The resource pool may be subdivided into multiple types. First, the resource pool may be divided according to contents of the D2D signal transmitted in each resource pool. As one example, the contents of the D2D signals may be divided as described below and each of the contents may be configured by a separate resource pool.

Scheduling assignment (SA): a signal including information such as the position of a resource which each transmitting UE uses for transmitting a trailing D2D data channel and modulation and coding schemes (MCS) required for demodulating other data channels or an MIMO transmission scheme. The signal may be multiplexed and transmitted together with D2D data on the same resource unit and in this case, an SA resource pool may mean a pool of resources in which SA is transmitted while being multiplexed with the D2D data.

D2D data channel: A pool which the transmitting UE uses for transmitting user data by using the resource designated through the SA. When the user data may be transmitted while being multiplexed with the D2D data on the same resource unit, only a D2D data channel without SA information may be transmitted in the resource pool for the D2D data channel. That is, resource elements used for transmitting the SA on individual resource units in the SA resource pool may still be used for transmitting the D2D data in the D2D data channel resource pool.

Discovery message: A resource pool for a message for the transmitting UE to transmit information such as an ID, or the like to allow adjacent UE to discover the transmitting UE itself.

As the D2D resource pool, different resource pools may be used according to transmission and reception attributes of the D2D signal even when the contents of the D2D signals are the same as each other. For example, in spite of the same D2D data channel or discovery message, the resource pools may be divided into different resource pools again according to a transmission timing determining scheme (for example, whether the D2D signal is transmitted at the time of receiving a synchronization reference signal or transmitted by applying a predetermined timing advance at the reception timing), a resource allocation scheme (for example, whether the eNB allocates transmission resources of individual signals to individual transmitting UE or the individual transmitting UE autonomously selects resources for transmitting the individual signals in the resource pool), and a signal format (for example, the number of symbols which each D2D signal occupies in one subframe or the number of subframes used for transmitting one D2D signal).

The UE which intends to transmit the data by the D2D first selects an appropriate resource among the resource pools to transmit the SA thereof. In this case, as a selection criterion of the SA resource, an SA resource which interlocks with a resource in which it is expected that there is no SA transmission of another UE or there is no data transmission in a trailing subframe depending on the SA may be preferentially considered. Further, the UE may select the SA resource which interlocks with the data transmission resource of which an interference level is anticipated to be low.

As illustrated in FIG. 21, the SA resource pool is shown prior to a series of D2D data channel resource pools and the receiving UE first attempts to detect the SA and when existence of data which the receiving UE needs to receive is discovered, the receiving UE may finally attempt to receive the data in the interlocked data resource.

FIG. 22 is a flowchart schematically illustrating one example of a method for selecting a synchronization signal of device to device (D2D) according to an embodiment of the present invention.

Referring to FIG. 22, the UE receives the D2DSS which is the D2D synchronization signal and when the D2DSS meets a specific condition, the UE may perform the synchronization by selecting the D2DSS.

In detail, the UE may initially perform the synchronization by selecting the D2DSS in order to perform a synchronization procedure for supporting the D2D service and the synchronization may be defined as initial D2DSS selection. That is, the initial D2DSS selection may represent a case in which the UE first selects the D2DSS after power is turned on or loses connectivity with the D2DSS and selects the D2DSS again when a predetermined time elapsed after losing the synchronization with the legacy D2DSS.

Further, a case in which the UE autonomously becomes an independent synchronization source (hereinafter, referred to as ISS) and thereafter, is first synchronized to another D2DSS other there than may also be referred to the initial D2DSS selection.

After the initial selection, the UE may search the synchronization signal transmitted from another UE or eNB every search period for receiving and searching the D2D synchronization signal and reselect the D2DSS at a reselection period indicating a previously (periodically) determined timing for reselecting the D2DSS for the synchronization and this may be defined as D2DSS reselection. That is, selecting an optimal D2DSS again every reselection period after the initial D2DSS selection or selecting a D2DSS sequence having a different attribute (for example, the ID, the contents, and the like) from the D2DSS sequence selected in the initial D2DSS selection) may be referred to as the D2DSS reselection.

In order to perform such a D2DSS reselection process, the UE may receive one or more D2DSSs for the D2D synchronization at the D2DSS reselection period after the initial D2DSS selection (S2202). The UE that receives the one or more D2DSSs may determine whether the one or more D2DSSs meet a specific condition (S2204) and perform the synchronization by selecting the D2DSS which meets the specific condition among the one or more D2DSSs (S2206).

In this case, the specific condition is used for the UE to select the optimal D2DSS and for example, the UE may select the optimal D2DSS by considering the reception power or the priority.

Such a D2DSS reselection process needs to be performed when the D2DSS meets the same condition as or stricter condition than the initial D2DSS selection process because the UE gives up the ISS role and performs the synchronization by selecting a new D2DSS even though the UE is the ISS or performs the synchronization by selecting not the legacy D2DSS but another D2DSS.

However, when the stricter condition than the legacy D2DSS is repeatedly performed whenever the D2DSS reselection process is performed, such a condition may be excessively applied, and as a result, a method which may solve the problem is proposed.

FIG. 23 is a flowchart illustrating one example of a method for reselecting a synchronization signal of device to device (D2D) through a synchronization signal reselection condition according to an embodiment of the present invention.

Referring to FIG. 23, in reselecting the D2DSS, a D2DSS reselection process may be performed by applying the same reselection condition as the initial condition which is applied during the initial D2DSS selection process.

In detail, first, first UE may selects a D2DSS (alternatively, a first synchronization signal) transmitted from second UE as an initial D2DSS through the initial D2DSS selection (S2302) and perform the synchronization with the selected initial D2DSS.

In this case, the first UE may select the D2DSS which meets the initial condition for selecting the D2DSS during the initial D2DSS selection process. For example, the first UE may select a D2DSS having a higher reception power level than a threshold value indicating a level of minimum reception power among one or more D2DSSs received to select the D2DSS.

Thereafter, the first UE may search the initial D2DSS and one or more D2DSSs transmitted from another UE, such as a D2DSS (alternatively, a second synchronization signal) transmitted from third UE while tracking the initial D2DSS (S2304). In this case, another D2DSS may be searched at a D2DSS search period and the D2DSS search period may include the D2DSS reselection period described above.

The first UE may determine received signal strengths, reception power, priorities, and the like of the initial D2DSS and other D2DSSs at the D2DSS search period.

Thereafter, when the D2DSS reselection period is reached (S2306), the first UE may determine whether the initial D2DSS and the other D2DSSs meet the reselection condition (S2308).

When the D2DSS reselection condition is described by using the reception power as an example, the first UE may determine whether the reception power levels of the initial D2DSS and other D2DSSs are higher than the threshold value (S2308).

According to the determination result, the first UE may perform the synchronization by selecting one of the D2DSSs having the higher reception power level than the threshold value (S2310).

In this case, when multiple D2DSSs having the higher reception power level than the threshold value exist except for the initial D2DSS, the first UE may select the D2DSS for the synchronization through the following methods.

First, the first UE may select a D2DSS having the highest reception power level among the D2DSSs having the higher reception power level than the threshold value. When the reception power level of the initial D2DSS is still measured to be equal to or higher than the threshold value, this case may mean that a channel environment from the initial D2DSS, and the like are not significantly changed. Further, the first method may be a process in which the reception power level from the initial D2DSS gradually decreases.

Therefore, the first UE may be synchronized with the D2DSS having the highest reception power level before the reception power level of the initial D2DSS is lower than the threshold value in order to stably track the synchronization.

Such a method may be used even when there is no target to compare the power reception power level because the first UE serves as the ISS.

Second, the initial D2DSS may be selected in order to maximally maintain a synchronized cluster and minimize a change in relay operation. In this case, the cluster means a group of UE synchronized to a cluster head and the cluster head means UE which provides the synchronization signal for the synchronization.

In this case, even though the initial D2DSS does not have the highest reception power level, when the reception power level of the initial D2DSS is higher than the threshold value, the D2DSS which is being tracked will not be changed by selecting the initial D2DSS. However, in this case, the initial D2SSS and the another D2DSS need to be distinguished from each other and information for distinguishing the initial D2DSS and the another D2DSS may be acquired through demodulation of the control channel associated with each D2DSS. For example, the information may include a cluster ID, an ISS ID alternatively, an ID of relay UE), a stratum level, and the like.

Through the information, when the reception power level of the initial D2DSS is higher than the threshold value through the information, the initial D2DSS may be selected.

Through such a method, the first UE may reselect the D2DSS by using the same threshold value as the initial D2DSS selection process and prevent the condition for reselection from being excessive.

FIG. 24 is a flowchart illustrating yet another example of the method for reselecting the synchronization signal of device to device (D2D) through the synchronization signal selection condition according to the embodiment of the present invention.

Referring to FIG. 24, during the D2DSS reselection process, the D2DSS may be selected through the reselection condition different from the initial condition which is the D2DSS selection criterion during the initial D2DSS selection process.

First, since steps S2402 and S2404 are the same as steps S2302 and S2304 of FIG. 23, a description thereof will be omitted.

Thereafter, when the D2DSS reselection period is reached (S2406), the first UE may determine whether the initial D2DSS and the other D2DSSs meet the reselection condition (S2408).

When the D2DSS reselection condition is described by using the reception power as an example, the first UE may determine whether the reception power levels of the initial D2DSS and other D2DSSs are higher than a first threshold value.

In this case, the first threshold value is a value acquired by adding a predetermined offset to a second threshold value indicating minimum reception power in the initial D2DSS selecting step. The first threshold value may increase only once or the limited number of times during the D2DSS reselection process after the initial D2DSS selection process. This is to maximally prevent an operation such as handover from being occurred by preventing hysteresis.

That is, this is to maximally prevent a cluster including the first UE from moving to another cluster when the cluster including the first UE does not have large mobility and it is important to continuously maintain the synchronization in the corresponding cluster.

For example, when the second threshold value is X dBm, the predetermined offset value is added to the first threshold value, and as a result, the first threshold value may become (X+α) dBm.

When multiple D2DSSs having the higher reception power than the first threshold value are provided in step S2408, the D2DSS may be selected by using two methods in step S2310 of FIG. 23 (S2416).

However, when the D2DSS having the higher reception power than the first threshold value does not exist, the UE may select the D2DSS by using the initial D2DSS selection condition. That is, the UE determines whether the D2DSS having the higher reception power than the second threshold value exists (S2410) to reselect the D2DSS (S2416).

In this case, when multiple D2DSSs having the higher reception power than the first threshold value are provided, the D2DSS may be selected by using two methods in step S2310 of FIG. 23.

When the D2DSS having the higher reception power than the first threshold value does not exist in step S2310, it may be determined whether the first UE is the ISS described above (S2412).

According to the determination result, when the first UE is an ISS, the first UE may track the D2DSS (S2402). However, when the first UE is not an ISS, the first UE operates as an ISS (S2414), and can track the D2DSS (S2402).

The first UE may select a best D2DSS during the D2DSS reselection process through such a method and the selection condition increases once or finitely during the D2DSS reselection process to prevent the selection condition during the D2DSS reselection process from being increased infinitely.

As yet another embodiment of the present invention, when the reselection condition is the initial D2DSS in step S2408, the second threshold value is applied to the reception power of the initial D2DSS and when the reselection condition is another D2DSS, the first threshold value is applied to the reception power of the another D2DSS to perform the D2DSS reselection process.

In this case, the legacy synchronized initial D2DSS is maximally maintained and when the new D2DSS is selected, the optimal D2DSS may be selected by increasing the threshold value.

FIG. 25 is a flowchart illustrating yet another example of the method for reselecting the synchronization signal of device to device (D2D) through the synchronization signal selection condition according to the embodiment of the present invention.

Referring to FIG. 25, after the initial D2DSS is selected, the D2DSS may be selected by considering the priority of the D2DSS in reselecting the D2DSS.

First, since steps S2502 and S2504 are the same as steps S2302 and S2304 of FIG. 23, a description thereof will be omitted.

Thereafter, when the D2DSS reselection period is reached (S2506), the first UE may determine whether the initial D2DSS and the other D2DSSs meet the reselection condition.

When the D2DSS reselection condition is described by using the priority of the D2DSS as an example, the first UE may continuously periodically track the initial d2dss and when the initial D2DSS is changed, the first UE may sense the change. For example, when the reception power of the initial D2DSS decreases or the tracking operation includes an operation of detecting another D2DSS, it may be sensed that the reception power of the detected another D2DSS increases by detecting the another D2DSS.

During the change, when another D2DSS (alternatively, the second synchronization signal) received from the third UE is detected in addition to the initial D2DSS, the first UE may determine the priority of the another D2DSS (S2508).

When the priority of the another D2DSS is lower than the priority of the initial D2DSS, the initial D2DSS may be continuously tracked without changing the synchronization signal until a next reselection period (S2504).

For example, in the case where the first UE synchronized with a D2DSS transmitted from a cluster head which is out of coverage, when the D2DSS is detected, which has the same priority as or a lower priority than the D2DSS, the first UE may continuously synchronize with the legacy D2DSS until the next reselection period without new synchronization with the D2DSS having the lower priority.

However, when the priority of the another D2DSS is higher than the priority of the initial D2DSS, the first UE may synchronize with the another D2DSS by selecting the another D2DSS (S2510). In this case, unlike FIG. 23 and FIG. 24, the first terminal may select the another D2DSS even if it is not the D2DSS reselection period, synchronize with the selected D2DSS and transmit the selected D2DSS in the D2DSS transmission period. At this time, the D2DSS transmission period indicates a period in which the first terminal transmits the synchronized D2DSS.

If another D2DSS having a higher priority than the initial D2DSS is found, the priority is not likely to be changed until the D2DSS reselection period. Therefore, even if the D2DSS reselection period is not selected, the selected D2DSS is synchronized and the selected D2DSS is transmitted.

For example, in the case where the first UE synchronized with the D2DSS transmitted from the cluster head which is out of coverage, when the PSS ad the SSS which are the synchronization signals transmitted from the eNB are detected, it is determined that the first UE exists in coverage or in partial coverage to synchronize with the PSS and the SS by selecting the PSS and the SSS.

However, in order to prevent the first terminal from performing the D2DSS re-selection operation at a point of time that is very independent of the D2DSS re-selection period, it is necessary to perform a measurement on D2DSSs other than the D2DSS that was synchronized immediately before or after the D2DSS re-selection And/or detection.

Through such a method, the first UE may select the synchronization signal for D2D synchronization based on the priority.

As still yet another embodiment of the present invention, the D2DSS selecting method through the reception power described in FIGS. 23 and 24 and the D2DSS selecting method through the priority described in FIG. 25 may be mixedly used.

That is, the first UE may reselect the D2DSS by considering the reception power and the priority.

FIG. 26 illustrates one example of a block diagram of a wireless communication apparatus according to an embodiment of the present invention.

Referring to FIG. 26, a wireless communication system includes an eNB 10 and multiple UEs 10 positioned in a region of the eNB 20.

The eNB 10 includes a processor 2602, a radio frequency (RF) unit 2604, and a memory 2606. The processor 2602 implements a function, a process, and/or a method which are proposed in FIGS. 1 to 25 given above. The layers of the radio interface protocol may be implemented by the processor 2602. The RF unit 2604 is connected with the processor 2602 to transmit and/or receive a radio signal.

The memory 2606 is connected with the processor 2602 to store various pieces of information for driving the processor 2602.

The UE 20 includes a processor 2612, an RF unit 2614, and a memory 2616. The processor 2612 implements a function, a process, and/or a method which are proposed in FIGS. 1 to 25 given above. The layers of the radio interface protocol may be implemented by the processor 2612. The RF unit 2614 is connected with the processor 2612 to transmit and/or receive a radio signal. The memory 2616 is connected with the processor 2612 to store various pieces of information for driving the processor 2612.

The processor may select the initial D2DSS for initial synchronization and thereafter, control the synchronization to be performed through the selected D2DSS by reselecting the D2DSS through the reselection condition at the D2DSS reselection period.

The memories 2606 and 2616 may be positioned inside or outside the processors 2602 and 2612 and connected with the processors 2602 and 2612 through various well-known means. Further, when the eNB 10 and/or the UE 20 may have one antenna or multiple antennas.

The aforementioned embodiments are acquired by combining the components and features of the present invention in a predetermined format. It should be considered that each component or feature is selective if not additionally clearly mentioned. Each component or feature may be implemented while being not combined with other components or features. Further, some components and/or features are combined to configure the embodiment of the present invention. A sequence of the operations described in the embodiments of the present invention may be changed. Some components or features of any embodiment may be included in another embodiment or replaced with corresponding components or features of another embodiment. It is apparent that claims having no clear quoting relation in the claims are combined to configure the embodiment or may be included as new claims by correction after application.

The embodiments of the present invention may be implemented by various means, for example, hardware, firmware, software, or combinations thereof. In the case of the implementation by the hardware, methods according to exemplary embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

When the embodiments are implemented by the firmware or the software, the embodiments of the present invention may be implemented in the form of a module, a procedure, a function, and the like to perform the functions or operations described above. A software code may be stored in the memory and executed by the processor. The memory may be positioned inside or outside the processor and send and receive data to and from the processor by various means which is already known.

It is apparent to those skilled in the art that the present invention may be implemented in another specific form within the scope without departing from the essential feature of the present invention. Therefore, the detailed description should not limitedly be analyzed in all aspects and should be exemplarily considered. The scope of the present invention should be determined by rational interpretation of the appended claims and all changes are included in the scope of the present invention within the equivalent scope of the present invention.

The aforementioned present invention is not limited to the aforementioned embodiments and the accompanying drawings, and it will be obvious to those skilled in the technical field to which the present invention pertains that various substitutions, modifications, and changes may be made within the scope without departing from the technical spirit of the present invention.

The invention claimed is:

1. A method for reselecting a synchronization signal in a wireless communication system supporting device-to-device direct communication, the method performed by a user equipment (UE), comprising:
   receiving a first synchronization signal from a first device and a plurality of synchronization signals from adjacent devices,
   wherein the first synchronization signal is previously selected as a current synchronization signal by comparing a first reception power level of the first synchronization signal with a first threshold value, and
   wherein the first threshold value is increased by a specific offset value each time the current synchronization signal is reselected;
   comparing the first reception power level with a second threshold value and reception power levels of the plurality of synchronization signals with the increased first threshold value,
   wherein the second threshold value is a value before the first threshold value is increased; and
   selecting a second synchronization signal among the first synchronization signal and the plurality of synchronization signals based on a result of the comparison, wherein one of the plurality of synchronization signals is selected as the second synchronization signal when the first reception power level is lower than the second threshold value and at least one of reception power levels of the plurality of synchronization signals is greater than the increased first threshold value.

2. The method of claim 1, further comprising:
comparing priorities indicating a priority of the plurality of synchronization signals with a first priority indicating a priority of the first synchronization signal.

3. The method of claim 2, wherein the first synchronization signal is selected regardless of a device-to-device (D2D) synchronization signal selection period when the first synchronization signal has a higher priority than the priorities.

4. The method of claim 1, further comprising:
determining whether the UE is an Independent Synchronization Source (ISS) when the first reception power level of first synchronization signal is lower than the second threshold value and there is no synchronization signal having a reception power level greater than the increased first threshold value among the plurality of synchronization signals, according to the comparison result; and
performing a role of ISS when the UE is determined not be the ISS.

5. The method of claim 1, wherein the first synchronization signal is selected as the second synchronization signal when the first reception power level is greater than the second threshold value and at least one of reception power levels of the plurality of synchronization signals is greater than the increased first threshold value.

6. The method of claim 1, wherein the one of the plurality of synchronization signals has a greatest reception power level among the plurality of synchronization signals.

7. The method of claim 1, further comprising:
obtaining information for distinguishing the first synchronization signal and the plurality of synchronization signals by demodulating control channels related to the first synchronization signal and the plurality of synchronization signals.

8. The method of claim 7, wherein the information includes at least one of cluster ID, ISS ID or stratum level.

9. A user equipment (UE) for reselecting a synchronization signal in a wireless communication system supporting device-to-device direct communication, the UE comprising:
a communication unit transmitting and receiving a radio signal; and
a processor functionally connected with the communication unit,
wherein the processor performs a control to:
receive a first synchronization signal from a first device and a plurality of synchronization signals from adjacent devices,
wherein the first synchronization signal is previously selected as a current synchronization signal by comparing a first reception power level of the first synchronization signal with a first threshold value, and
wherein the first threshold value is increased by a specific offset value each time the current synchronization signal is reselected;
compare the first reception power level with a second threshold value and reception power levels of the plurality of synchronization signals with the increased first threshold value,
wherein the second threshold value is a value before the first threshold value is increased; and
select a second synchronization signal among the first synchronization signal and the plurality of synchronization signals based on a result of the comparison,
wherein one of the plurality of synchronization signals is selected as the second synchronization signal when the first reception power level is lower than the second threshold value and at least one of reception power levels of the plurality of synchronization signals is greater than the increased first threshold value.

10. The UE of claim 9, wherein the processor further performs a control to:
determine whether the UE is an Independent Synchronization Source (ISS) when the first reception power level of first synchronization signal is lower than the second threshold value and there is no synchronization signal having a reception power level greater than the increased first threshold value among the plurality of synchronization signals, according to the comparison result; and
perform a role of ISS when the UE is determined not be the ISS.

11. The UE of claim 9, wherein the first synchronization signal is selected as the second synchronization signal when the first reception power level is greater than the second threshold value and at least one of reception power levels of the plurality of synchronization signals is greater than the increased first threshold value.

12. The UE of claim 9, wherein the one of the plurality of synchronization signals has a greatest reception power level among the plurality of synchronization signals.

13. The UE of claim 9, wherein the processor performs a control to:
obtain information for distinguishing the first synchronization signal and the plurality of synchronization signals by demodulating control channels related to the first synchronization signal and the plurality of synchronization signals.

14. The UE of claim 13, wherein the information includes at least one of cluster ID, ISS ID or stratum level.

* * * * *